US010606370B2

(12) United States Patent
Potts

(10) Patent No.: US 10,606,370 B2
(45) Date of Patent: Mar. 31, 2020

(54) MULTI-MODE KEYBOARD

(71) Applicant: Pro-Boards, LLC, Madison, WI (US)

(72) Inventor: Brian H. Potts, Madison, WI (US)

(73) Assignee: Pro-Boards, LLC, Madison, WI (US)

( * ) Notice: Subject to any disclaimer, the term of this patent is extended or adjusted under 35 U.S.C. 154(b) by 0 days.

(21) Appl. No.: 16/503,380

(22) Filed: Jul. 3, 2019

(65) Prior Publication Data

US 2019/0324557 A1 Oct. 24, 2019

Related U.S. Application Data

(63) Continuation of application No. 15/259,048, filed on Sep. 8, 2016, now Pat. No. 10,345,921.

(51) Int. Cl.
*G06F 3/02* (2006.01)

(52) U.S. Cl.
CPC .................................. *G06F 3/0227* (2013.01)

(58) Field of Classification Search
CPC ......... G09G 5/00; G06F 3/044; G06F 3/0418; G06F 3/0488
USPC ......... 345/169, 173, 174, 168; 715/810, 818
See application file for complete search history.

(56) References Cited

U.S. PATENT DOCUMENTS

| | | | | |
|---|---|---|---|---|
| 4,075,679 A * | 2/1978 | Christopher | G06F 15/02 | 341/22 |
| 4,437,156 A * | 3/1984 | Christopher | G06F 15/02 | 708/139 |
| 7,512,571 B2 * | 3/2009 | Rudolf | G06N 3/063 | 706/14 |
| 9,348,458 B2 * | 5/2016 | Hotelling | G06F 3/0418 | |

* cited by examiner

*Primary Examiner* — Calvin C Ma

(57) ABSTRACT

A method includes receiving a first keystroke signal from a keyboard indicating a first key has been pressed while operating in a first state, switching the keyboard from the first state to a second state. During the second state, a second keystroke signal is received from the keyboard indicating a second key has been pressed. In response, a plurality of keystroke signals is determined and sent to a second computing device during the second state. Further during the second state, a third keystroke signal is received from the keyboard indicating a third key has been pressed. In response, the keyboard switches from the second state to a third state. During the second state, the keyboard is compatible with a first type of computing device or word processing application. During the third state, the keyboard is compatible with a second type of computing device or word processing application.

16 Claims, 26 Drawing Sheets

Fig. 3
300
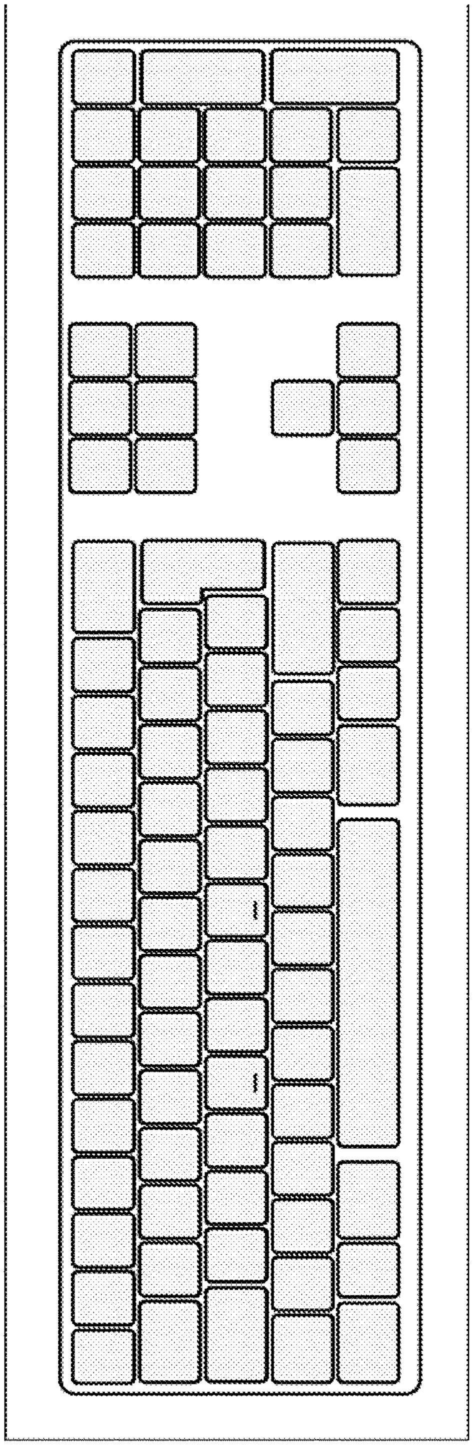
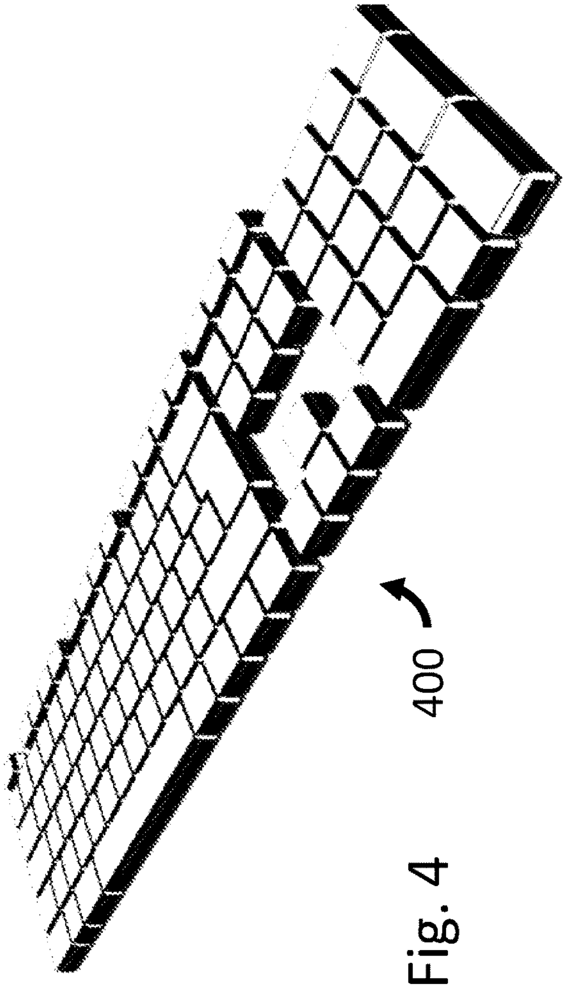
400
Fig. 4

MULTI-MODE KEYBOARD

CROSS-REFERENCE TO RELATED APPLICATION

This application is a continuation of and claims priority to U.S. patent application Ser. No. 15/259,048, filed on Sep. 8, 2016, and entitled "MULTI-MODE KEYBOARD" (now granted as U.S. Pat. No. 10,345,921), the disclosure of which is hereby expressly incorporated by reference in its entirety.

BACKGROUND

Computers are ubiquitous in today's society. Many humans interact with computing devices on a daily or even hourly basis. Computing devices often include a user interface so that a user can interact with the computer. For example, a user may view information on a display of a computing device. A user may hear information through speakers or headphones. A user may input information into a computing device through various types of inputs, such as digital keyboards, mechanical keyboards, touch screens, cameras, mice, buttons, joysticks, microphones, or any other type of input device.

SUMMARY

An illustrative method includes receiving, by a processor of a computing device, a first keystroke signal from a keyboard indicating that a first key has been pressed. Prior to receiving the first keystroke signal, the keyboard operates in a first state. The method further includes switching, by the processor, the keyboard from the first state to a second state in response to receiving the first keystroke signal. The method further includes receiving, by the processor during the second state, a second keystroke signal from the keyboard indicating that a second key has been pressed. The first key is different from the second key. The method further includes determining, by the processor, a plurality of keystroke signals in response to receiving the second keystroke signal during the second state. The method further includes sending, by the processor during the second state, the plurality of keystroke signals to a second computing device.

An illustrative system includes a memory and a processor coupled to the memory. The processor is configured to receive a first keystroke signal from a keyboard that indicates that a first key has been pressed. Prior to reception of the first keystroke signal, the keyboard operates in a first state. The processor is further configured to switch the keyboard from the first state to a second state in response to reception of the first keystroke signal. The processor is further configured to receive, during the second state, a second keystroke signal from the keyboard that indicates that a second key has been pressed. The first key is different from the second key. The processor is further configured to determine a plurality of keystroke signals in response to reception of the second keystroke signal during the second state. The processor is further configured to send, during the second state, the plurality of keystroke signals to a second computing device.

An illustrative non-transitory computer readable medium having instructions stored thereon that, upon execution by a computing device, cause the computing device to perform operations including receiving a first keystroke signal from a keyboard indicating that a first key has been pressed. Prior to receiving the first keystroke signal, the keyboard operates in a first state. The operations further include switching the keyboard from the first state to a second state in response to receiving the first keystroke signal. The operations further include receiving, during the second state, a second keystroke signal from the keyboard indicating that a second key has been pressed. The first key is different from the second key. The operations further include determining a plurality of keystroke signals in response to receiving the second keystroke signal during the second state. The operations further include sending, during the second state, the plurality of keystroke signals to a second computing device.

BRIEF DESCRIPTION OF THE DRAWINGS

Illustrative embodiments will hereafter be described with reference to the accompanying drawings.

FIG. 3 shows another alternate view of an ornamental keyboard layout in accordance with an illustrative embodiment.

FIG. 4 shows a perspective view of an ornamental keyboard layout in accordance with an illustrative embodiment.

DETAILED DESCRIPTION

Described herein are illustrative embodiments for a multi-mode keyboard. The keyboard has a first mode or state that operates as a normal keyboard. When a particular key of the keyboard is pressed the keyboard switches to a second mode or state that causes different functions to be performed (relative to the first mode or state) when at least some of the keys of the keyboard are pressed. For example, the multi-mode keyboard may be configured to output different keystrokes for a particular button in the second state as opposed to the first state. In various embodiments, different keys may have different functions in the second state. For example, on a number pad of a keyboard, pressing the nine (9) key may cause the system send a number nine (9) keystroke to a computing device when the nine (9) key is pressed during the first state. During the second state, if the nine (9) key is pressed, the system may send multiple keystrokes that are not related to the number nine (9), such as keystrokes associated with function. As just one example, the keystrokes sent as a result of pressing the nine (9) key during the second mode may be associated with functions such as starting a bullet list in Microsoft Word™.

In this way, keyboards may be configured to expand their functionality without changing or adding keys to a keyboard or sacrificing functionality of keys already existing on a keyboard, such as number, letter, etc. keys. Furthermore, keyboards according to various embodiments can advantageously be configured for various specializations. For example, keyboards as disclosed herein may be configured for use by legal professionals (including configured for different jurisdictions, courts, nations, etc.), medical professionals, bookkeeping or accounting professionals, mathematicians, teaching professionals, administrative professionals, music or film production/editing/recording professionals, art/photography/graphic design professionals, word processing professionals, translating professionals, persons who speak different languages, chemical fields professionals, and/or biology field professionals. The keyboards described herein can also be configured for any other persons, professions, tasks, or uses.

Figure 1:
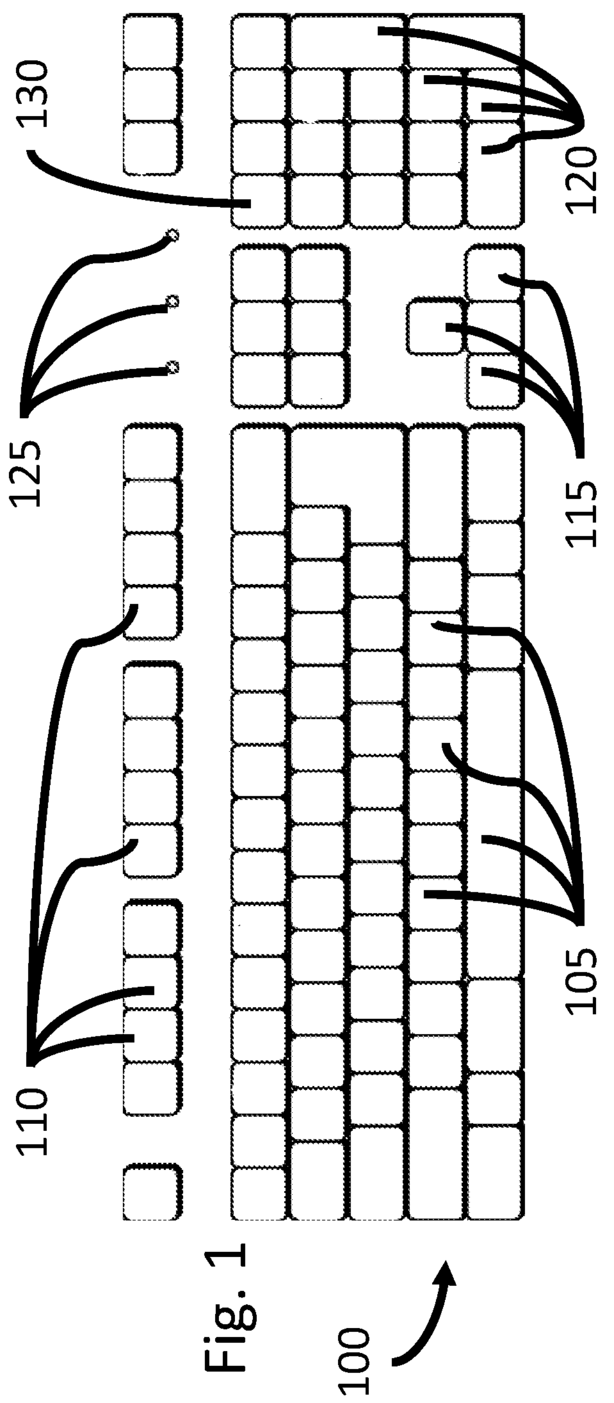
FIG. 1 shows a view of an ornamental keyboard layout in accordance with an illustrative embodiment.

FIG. 1 shows a view of an ornamental keyboard layout 100 in accordance with an illustrative embodiment. The ornamental keyboard layout 100 includes function keys 110, qwerty keys 105, indicator lights, number keys 115, number pad keys 120, and other miscellaneous keys. The keyboard layout also includes a key 130 that can be pressed to toggle the keyboard between a first and second mode as discussed herein. In various embodiments, a key to toggle between modes/states of the keyboard may be any of the keys shown in FIG. 1. Furthermore, in various embodiments, more than one key may toggle to different modes for different sections of the keyboard. In various embodiments, a toggle key may cycle between three or more modes.

In the ornamental keyboard layout 100, the toggle key 130 switches modes for only certain keys of the ornamental keyboard layout 100. In this embodiment, the function keys 110 and the number pad keys 120 switch functions depending on whether the toggle key 130 has been pressed to transition the keyboard between modes. In various alternative embodiments, different keys, more keys, and/or less keys may change functions based on the mode/state of the keyboard. One or more of the indicator lights 125 may be used to show a mode/state of the keyboard. For example, if the keyboard is in a first state, a first indicator light is off, while the light will be on if the keyboard is in a second state. In another example, an indicator light may display different colors based on the mode/state the keyboard is in. In this way, a user of the keyboard can easily determine what mode the keyboard is in visually, and be assured that upon pressing the toggle key 130, the keyboard has indeed changed states. In various embodiments, a keyboard may also indicate what state the keyboard is in in other ways, such as a light embedded in a key of the keyboard, a text display on the keyboard, an indication of the state of the keyboard on a user interface of a computing device the keyboard is communicating with, or any other way of indicating what state the keyboard is in.

Figure 2:
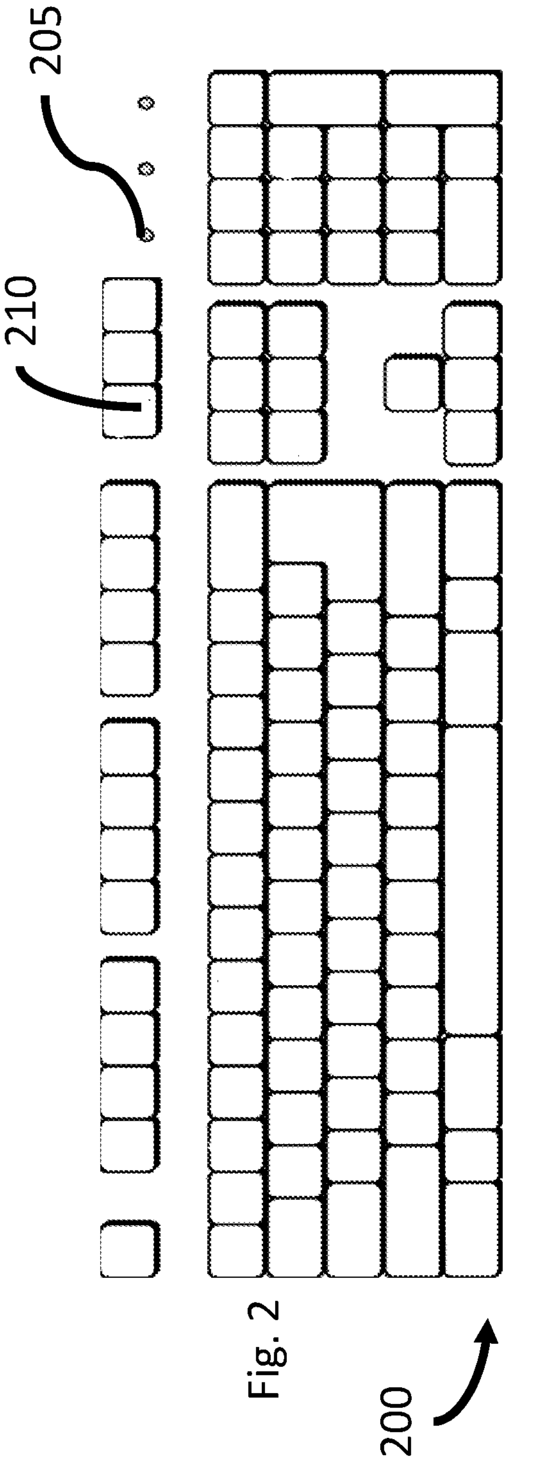
FIG. 2 shows an alternate view of an ornamental keyboard layout in accordance with an illustrative embodiment.

FIG. 2 shows an alternate view of an ornamental keyboard layout 200 in accordance with an illustrative embodiment. The ornamental keyboard layout 200 is similar to the keyboard layout 100 of FIG. 1. However, on the ornamental keyboard layout 200, the position of indicator lights 205 and keys 210 are switched in comparison to the keyboard layout 100. In alternative embodiments, some of which are disclosed herein, other configurations of keyboard layouts may be used and are contemplated by the present disclosure.

FIG. 3 shows another alternate view of an ornamental keyboard layout 300 in accordance with an illustrative embodiment. The ornamental keyboard layout 300 shows another possible configuration for keys of a keyboard that has the functionalities described herein.

FIG. 4 shows a perspective view of an ornamental keyboard layout 400 in accordance with an illustrative embodiment. The ornamental keyboard layout 400 shows another possible configuration for keys of a keyboard that has the functionalities described herein.

Figure 5:
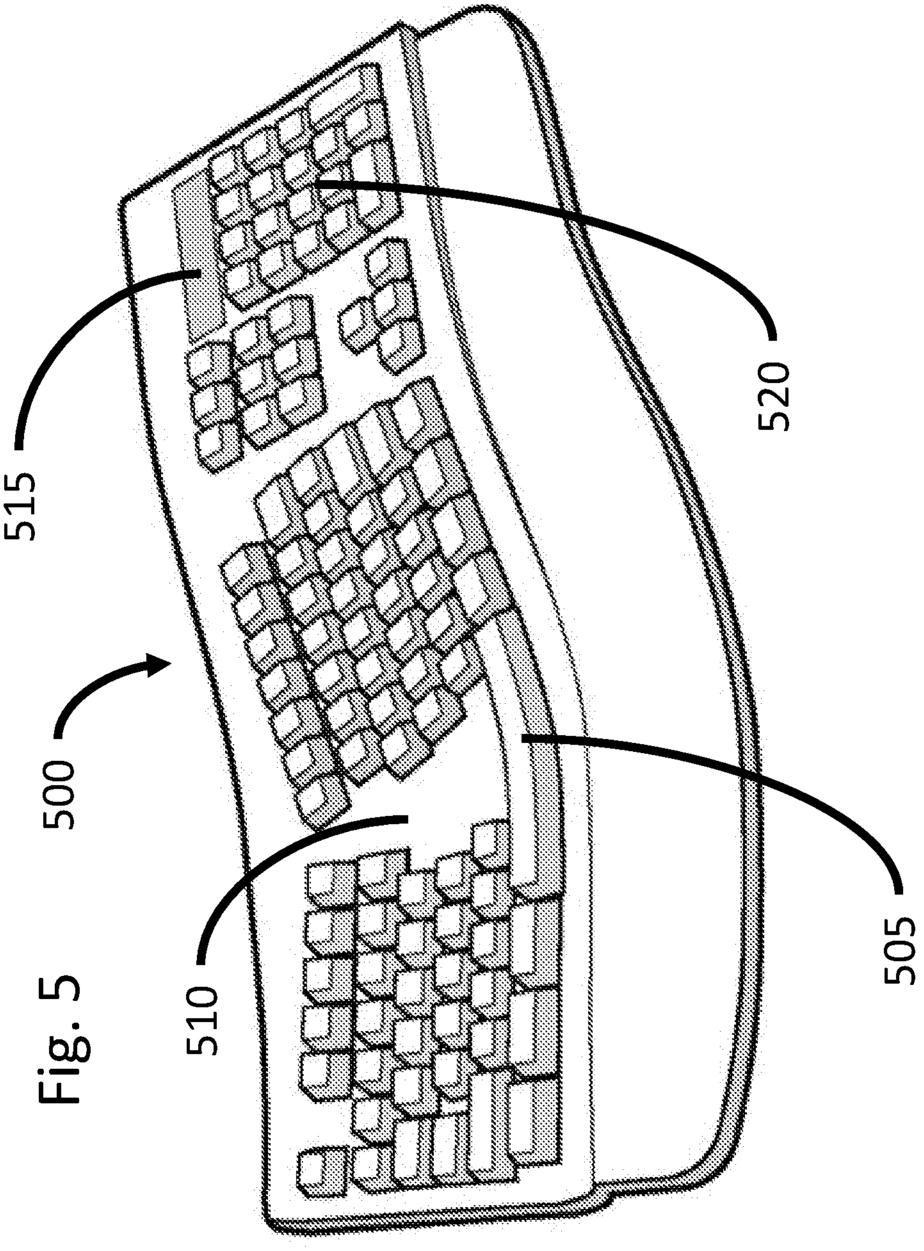
FIG. 5 shows an ornamental ergonomic layout of a keyboard in accordance with an illustrative embodiment.

FIG. 5 shows an ornamental ergonomic layout 500 of a keyboard in accordance with an illustrative embodiment. The ornamental ergonomic layout 500 shows a keyboard that is designed to give some users more comfort when using a keyboard. The ergonomic layout includes, in this example, an elongated space bar 505 that spans a gap 510 in the middle of the qwerty keys on the keyboard. The ergonomic layout still includes an indicator area 515 and number keys 520, similar to the keyboard layouts of FIGS. 1 and 2 discussed above.

Any of the ornamental keyboard layouts (e.g., FIGS. 1-5) may be used according to the functions, methods, systems, computer readable media, and embodiments as disclosed herein. In just one example of implementing the methods and systems disclosed herein, a multi-mode keyboard for legal professionals is discussed below. Any of the various ornamental keyboard layouts disclosed herein may have various ornamental layouts of keys and symbols, letters, numbers, etc. printed therein as disclosed herein. The functions and methods disclosed herein can be practiced on keyboards with any of the ornamental designs disclosed herein.

Figure 6:
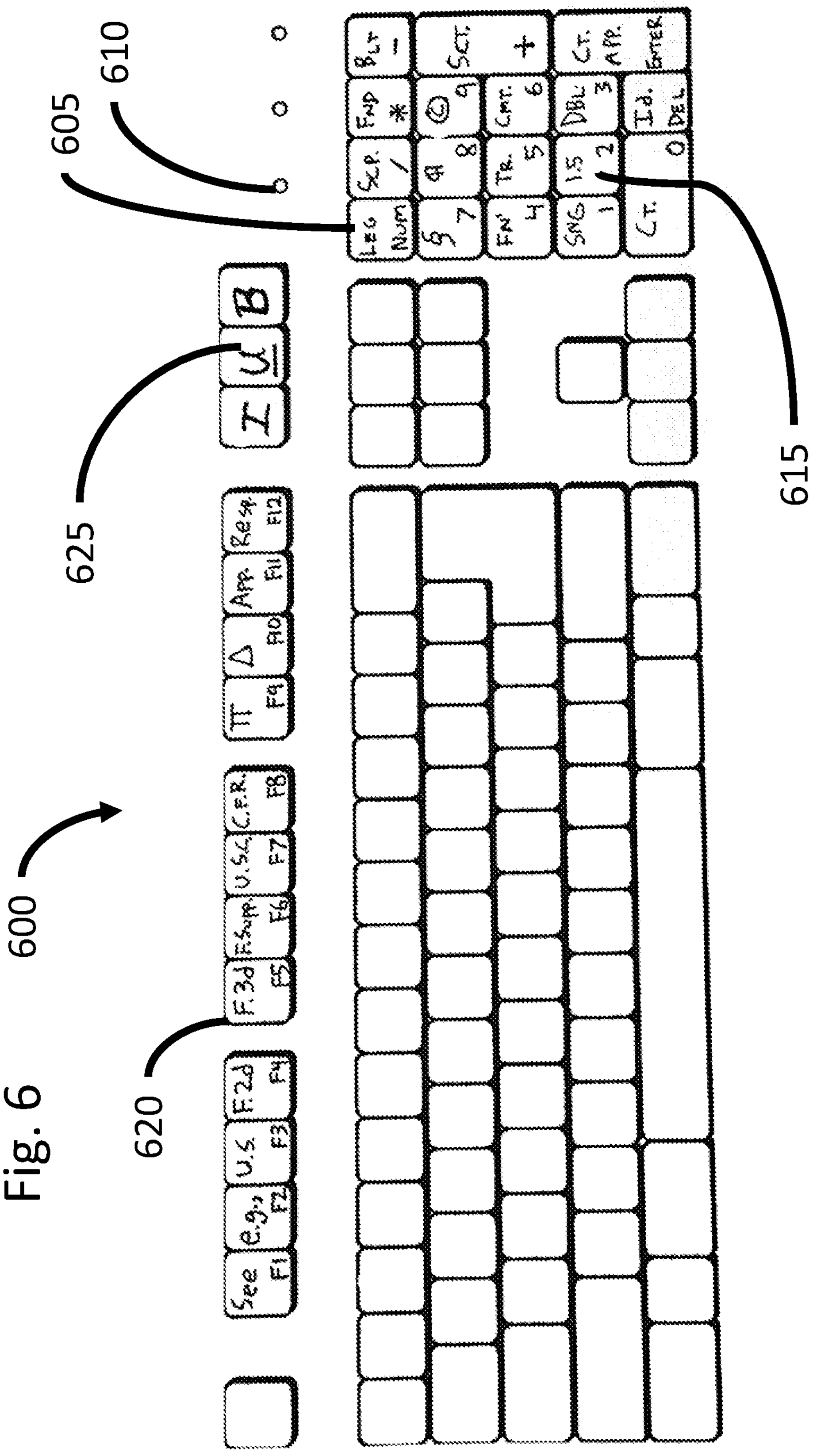
FIG. 6 shows an ornamental legal layout of a keyboard in accordance with an illustrative embodiment.

FIG. 6 shows an ornamental legal layout 600 of a keyboard in accordance with an illustrative embodiment. The ornamental legal layout 600 in that the keys described below could be designated as any key of the keyboard, such that the location of a particular key with a particular function is merely an ornamental or design choice. Additional ornamental designs that may be used in a legal or other mode are disclosed herein. The ornamental legal layout 600 includes a toggle key 605. The toggle key 605, when pressed, switches the keyboard between a legal mode/state and a number mode/state. An indicator light 610 turns on when the toggle key 605 is pressed to switch the keyboard into the legal mode/state. The indicator light turns off when the toggle key 605 is subsequently pressed to switch the keyboard into the number mode/state.

Various keys of the ornamental legal layout 600 have thereon an indication of their function in both modes/states. When in the legal state/mode, some keys, when pressed, cause the system to send keystrokes associated with alphanumeric characters, while other keys, when pressed cause the system to send keystrokes associated with a function (which may also include alphanumeric characters). In other words, a first group of keys will have the same function regardless of whether the keyboard is in a special mode or state, while a second group of keys will have a special function during a special (e.g., legal) mode or state. For example, a key 615, when pressed in number mode/state, causes the system to send a keystroke for the number two (2). When the key 615 is pressed in the legal mode/state, the system sends keystrokes of the function for causing one and half (1.5) line spacing in a word processing software or other similar text entry computer software program. For example, in the Microsoft Office™ suite of products, the system would send a control button keystroke followed by the number (5) keystroke, which is the function code for 1.5 line spacing. Similarly, a key 625, when pressed while the keyboard is in the legal mode/state, causes keystrokes associated with the function for underlining text to be sent from the keyboard. Such functionality is advantageous to a user of the keyboard because certain functions can be performed, turned on/off, etc. with a single press of a key. Without the methods and systems disclosed herein, a user may have to enter multiple keys associated with a function. In many cases, a user may not even be aware of those keys associated with a function or a user just prefers not to press all of those keys. In such instances, a user may have to use a mouse or other input device to interact with a graphical user interface to change or implement a function. If the user is typing a document, doing so may cost them significant time, because the user may have to press many keys or move their hand off the keyboard to a mouse or other input device for a time, implement the function, and then find the keyboard again to resume inputting for the document. With the systems and methods disclosed herein, a user could save significant amounts of time when editing and/or writing documents.

The ornamental legal layout 600 further provides for a user to implement the following functions: italicizing text, bolding text, small caps text (key labeled "$S_{CP}$."), find function (to search for a word or phrase in a document; key labeled "$F_{ND}$"), start a bulleted list function (key labeled "$B_{LT}$"), insert footnote function ("$F_N{}^1$"), track changes function ("$T_R$."), insert a comment function ("$C_{MT}$."), single (1) line spacing, double (2) line spacing, insert section symbol (§) function, insert paragraph symbol (¶) function, and insert copyright symbol (©) function. In various embodiments, other functions may be included/incorporated into a multi-mode keyboard.

In contrast, when a key 620 is pressed in number mode, the F5 keystroke is sent, while if the key 620 is pressed in the legal mode, the system sends alphanumeric characters that are not associated with a function recognized by a computer software application receiving the keystroke signals. For the key 620, when it is pressed in the legal mode, the system sends keystrokes associated with the text "F.3d". That is, the system sends, when the key 620 is pressed during the legal mode, keystroke signals associated with a capital letter "F", followed by a period ".", followed by the number three "3", and lastly followed by a lower case "d". All four of those characters are sent automatically by the system when the key 620 is pressed during the legal mode. Advantageously, a user of the keyboard therefore does not need to type each character for frequently used alphanumeric strings that are programmed to automatically generate upon pressing of a single key. For the key 620, such characters may be useful for a legal professional who frequently uses the text string "F.3d" in citing certain case law for briefs, decisions, memos, etc.

Other text strings that can be quickly input by the keyboard in FIG. 6 during the second mode/state include "See", "e.g.,", "U.S.", "F.2d", "F.Supp.", "U.S.C.", "C.F.R.", "Plaintiff" (shown on the ornamental legal layout 600 by the symbol for pi (π)), "Defendant" (shown on the ornamental legal layout 600 by the symbol for delta (Δ)), "Appellant" (shown on the ornamental legal layout 600 by the abbreviation "App."), "Respondent" (shown on the ornamental legal layout 600 by the abbreviation "Resp."), "id.", "S. Ct.", and "Ct. App." In various embodiments, more, less, and/or different text strings may be input using a keyboard as disclosed herein. Such text strings may be stored, for example, in a lookup table stored in a memory that has the key-specific keystrokes for each text string stored therein. In this way, the system can determine, based on which key is pressed, which of the key-specific plurality of keystrokes to send to a computing device.

Figure 7A:
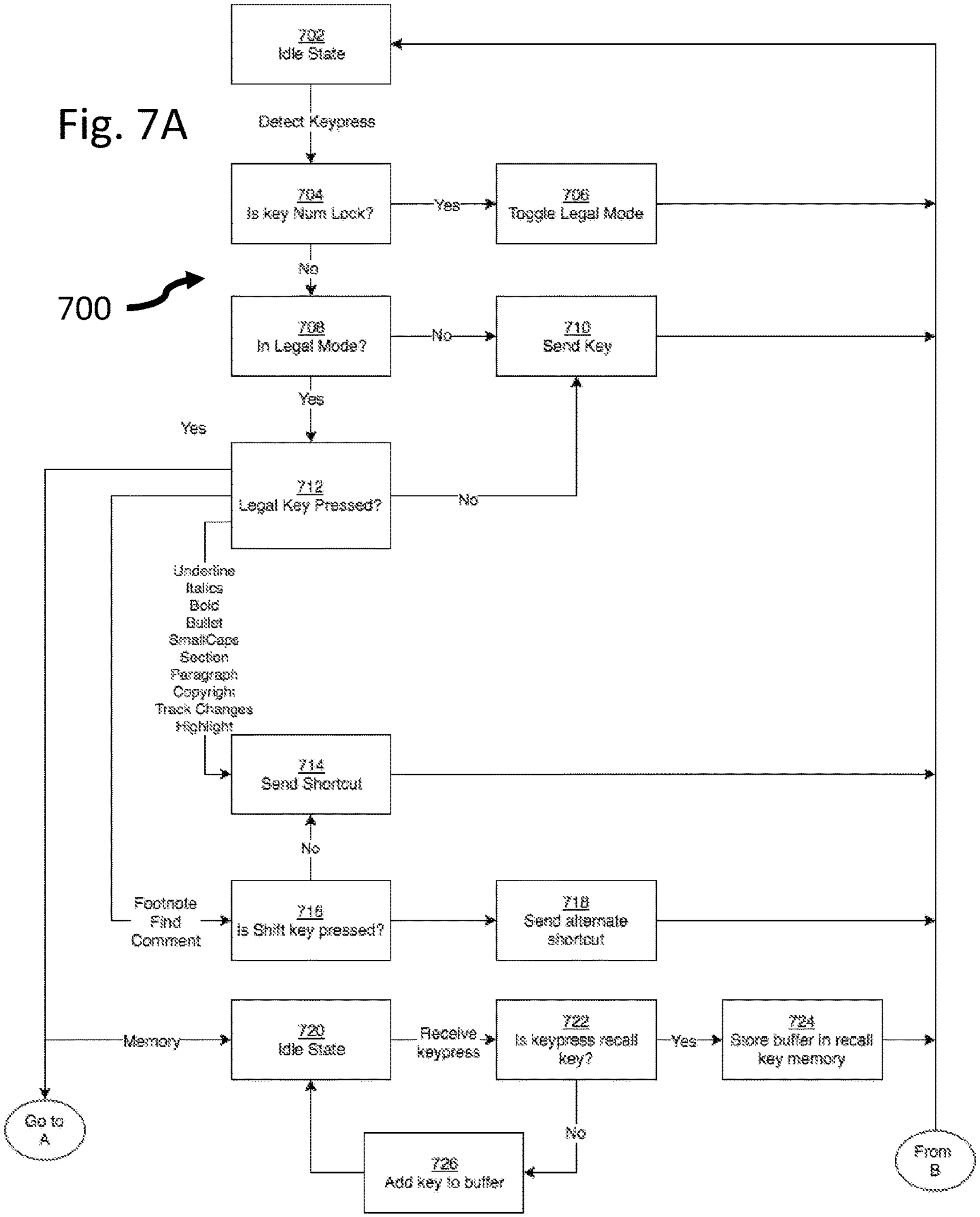
FIGS. 7A and 7B show a state diagram of a multi-mode keyboard in accordance with an illustrative embodiment.
Figure 7B:
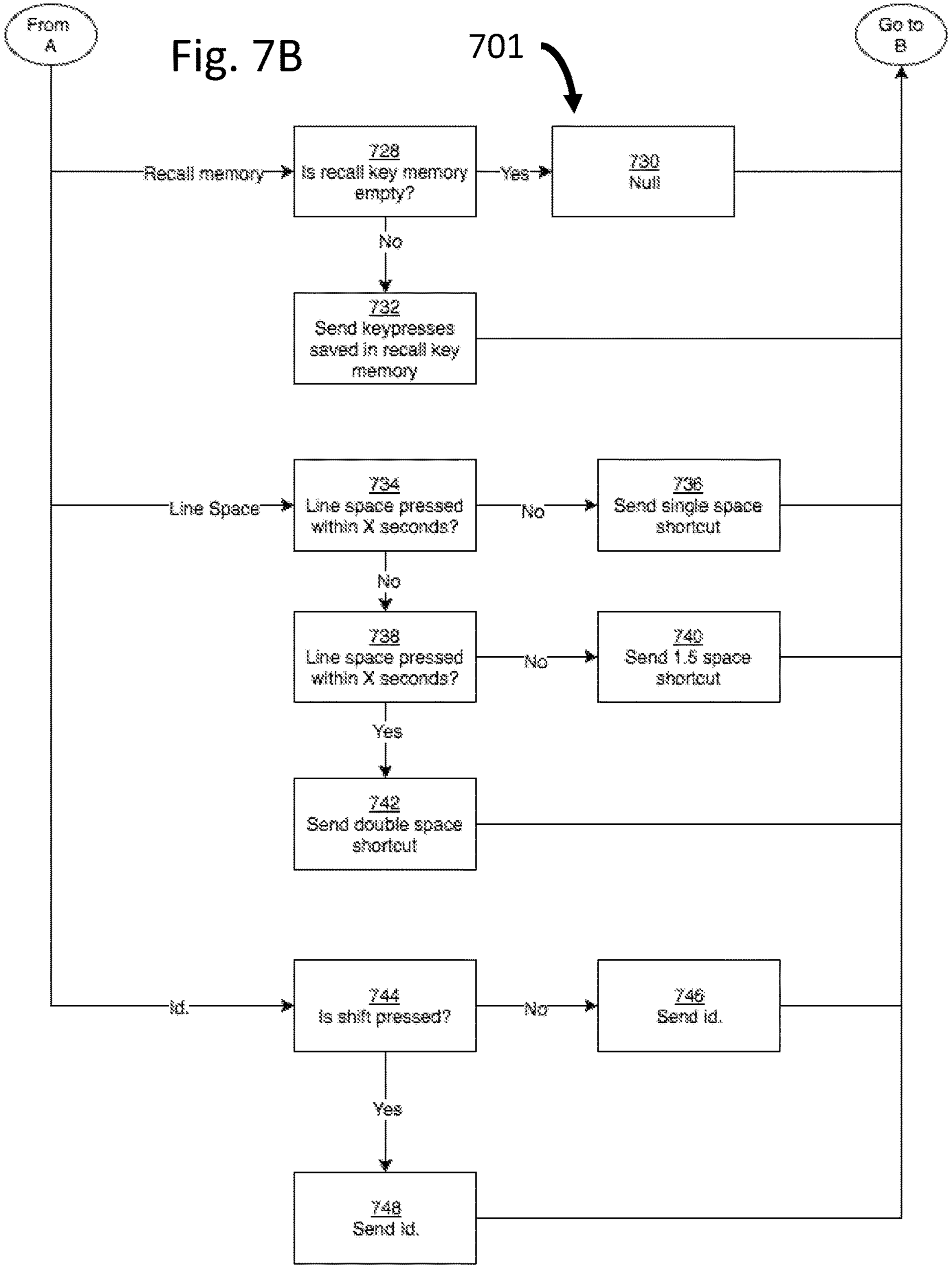

FIGS. 7A and 7B show a state diagram 700 and 701 of a multi-mode keyboard in accordance with an illustrative embodiment. In the state diagram 700 of FIG. 7A, the system is in an idle state at an operation 702. At the operation 702, the system waits for a keypress. If a received key press is a toggle key at an operation 704 (such as the toggle key 605 or number lock key from the ornamental legal layout 600), then the system toggles legal mode at an operation 706. If the keyboard was previously in legal mode, then the toggle key or num lock would switch the keyboard out of legal mode. Conversely, if the keyboard was previously in a first or normal mode, the toggle key or num lock would switch the keyboard into legal mode.

If a detected keypress is not a toggle or num lock key, the system determines if the keyboard is in legal mode at an operation 708. If the keyboard is not in legal mode, then the keyboard sends the keypress associated with the key at an operation 710, as would be done in a normal mode of the keyboard. If the keyboard is in legal mode, the system determines if the keypress is associated with one of the legal keys that has a different function or output associated with it during the legal mode in an operation 712. If a legal key has not been pressed, the keyboard sends the keypress associated with the key at the operation 710, as would be done in a normal mode of the keyboard. If a legal key has been pressed during the legal mode, the system will proceed to one of operation 714, 716, 720, 728, 734, or 744, depending on what legal key has been pressed. FIGS. 7A and 7B are linked by A and B. That is, if the system proceeds to operations 728, 734, or 744 (of FIG. 7B) the system does so from the operation 712 (of FIG. 7A) depending on which key has been pressed. Similarly, the system may return to an idle state 702 from the various operations on either FIG. 7A or 7B (including through B on FIGS. 7A and 7B).

If the system receives a keypress from a legal key associated with a particular function that has a keystroke sequence shortcut, the system sends a series of keystrokes associated with that function. For example, at an operation 714, if the key for underline, italics, bold, bullet list, small/large caps, section symbol, paragraph symbol, copyright symbol, track changes, or highlight is pressed, the system will send the keys associated with the shortcut for those functions. For example, the italics function may involve sending the keystrokes associated with a Control/Command button and the letter I button. After the shortcut is sent at the operation 714, the system returns to the idle state 702 waiting for another keypress.

If the buttons associated with other special functions are pressed, the system may do more than merely send a plurality or series of keystrokes. For example, if one of the buttons associated with the footnote function, the find function, or comment function is pressed during a legal mode, the system will determine at an operation 716 whether the shift key was pressed when the footnote, find, or comment functions were pressed. If the shift key was not pressed, a shortcut for those functions is sent at the operation 714. If the shift key was pressed, the system sends an alternate shortcut at an operation 718. For example, if the footnote key was pressed when the shift key was not pressed, the system will send the shortcut keystrokes to insert a footnote.

If the footnote key was pressed when the shift key was pressed, the system will send keystrokes associated with a function for returning a cursor of a word processing program from a footnote back to a main body of a document. The cursor, when it returns to the main body of a document, can return to where the cursor was before a footnote was inserted and/or activated (i.e., the cursor can return to wherever it was before the cursor was made active in the footnote). Similarly, the system can send shortcuts associated with the find and/or comment functions when those buttons are pressed when the shift key is not pressed at the same time; and can send alternate shortcut functions when shift is pressed such that a cursor returns to the main body of a document from a find dialog and/or comment. In various embodiments, alternate functions may also be sent when legal keys are pressed while other keys than shift are also pressed, such as an alt (alternate) key, a control key, a shift key, an option key, a function key, and/or a command key.

Operations 720, 722, 724, 726, 728, 730, and 732 describe a memory functionality. Here a series of keystrokes may be stored by the system in order to reproduce while pressing only one key on the keyboard. For example, if a user of the system was typing a document in which the phrase "the United States Patent & Trademark Office" is frequently used, using the process described below, a user may press a memory button, record keystrokes associated with "the United States Patent & Trademark Office," and press a memory button to end the recording. Subsequently, whenever the user would like to type "the United States Patent & Trademark Office," the user can press a memory button to automatically send the keystrokes associated with "the United States Patent & Trademark Office" by the pressing of a single memory button. In this way, a user can save time and keystrokes.

In particular, a memory of the system goes into an idle state 720 when a memory button is received. As disclosed herein a memory button is pressed to record keystrokes, and a memory recall button is pressed to recall and send previously recorded keystrokes. In the idle state 720, the system listens for keystrokes to record until a memory recall button is pressed. The memory recall button is pressed to record the keystrokes that can be recalled by pressing the memory recall button in the future. During the idle state 720, a keypress is received. If the keypress is determined not to be a recall memory key at an operation 722, the system adds the keystroke/keypress to a buffer at an operation 726. The system can go back to the idle state 720 and receive subsequent keypresses (that are not a recall memory key) to be added to the buffer. If a recall memory key is determined to be pressed at the operation 722, the system stores the keypresses stored in the buffer into a recall key memory. In some embodiments there may be multiple recall memory keys. The recall memory key pressed is associated with the stored keypresses. In this way, a user may record multiple strings of characters and associate them with different recall memory keys. The memory key to initiate recording may be the same regardless of which recall memory key is pressed to store the keystrokes recorded in the buffer.

Referring now to FIG. 7A, if a recall memory key is pressed, the system determines whether any keystrokes have been recorded and associated with that recall memory key at an operation 728. If the recall memory key memory is empty, the system does not take any action at an operation 730. If the memory is not empty when the recall memory key is pressed, the system sends keypresses/keystrokes associated with that recall memory key that are stored in the memory in an operation 732. As discussed herein, this can allow a user to quickly enter text that has been previously recorded. In some embodiments, a user may also record keystrokes associated with legal keys, including series of keystrokes, functions, and alternate functions.

The ornamental legal layout 600 of FIG. 6 shows three separate buttons for a legal mode associated with line spacing function (single, 1.5, and double spacing). In other embodiments, such as the one described in FIG. 7A and 7B, the system may have one button for line spacing that toggle through various spacing functions. For example, if a single line space button is pressed, the system determines in an operation 734 if the line space button has been pressed again within a predetermined threshold of seconds (e.g., 0.1 seconds, 0.25 seconds, 0.4 seconds, 0.5 seconds, 0.6 seconds, 0.75 seconds, 0.8 seconds, 0.9 seconds, 1 second, 1.5 seconds, 2 seconds, anywhere between 0-2 seconds). If the line spacing button is not pressed again within the predetermined amount of time, the system sends keystrokes associated with a function for single (1) spacing at an operation 736. If the line spacing button is pressed again within a predetermined threshold of time, the system listens again to determine if the line space button is pressed a third time within a predetermined threshold of time from when the second time the line space button was pressed. This predetermined threshold may be the same or different from the first predetermined threshold of time. In an alternative embodiment, there may be a single predetermined threshold of time for listening for both a second and third subsequent line space button keypress.

If the line space button is not pressed a third time within the predetermined amount of time, the system will send keystrokes associated with a 1.5 space function at an operation 740. If the line space button is pressed a third time within the predetermined amount of time, the system will send keystrokes associated with a double (2) space function at an operation 742.

If an "id." button is pressed during legal mode, either the keystrokes associated with "id." may be sent or an alternative set of keystrokes may be sent, such as "Id." For example, the system can determine if the shift key is pressed when the "id." button is pressed at an operation 744. If the shift button is not pressed, the system sends the keystrokes associated with "id." If the shift button is pressed, the system sends the keystrokes associated with "Id." In some embodiments, the alternate key being pressed may cause additional functions or may cause a function instead of capitalization. For example, the "Id." or "id." may be input with italics or underline when the alternate key (e.g., the shift key) is depressed when the "id." button is pressed.

Figure 8:
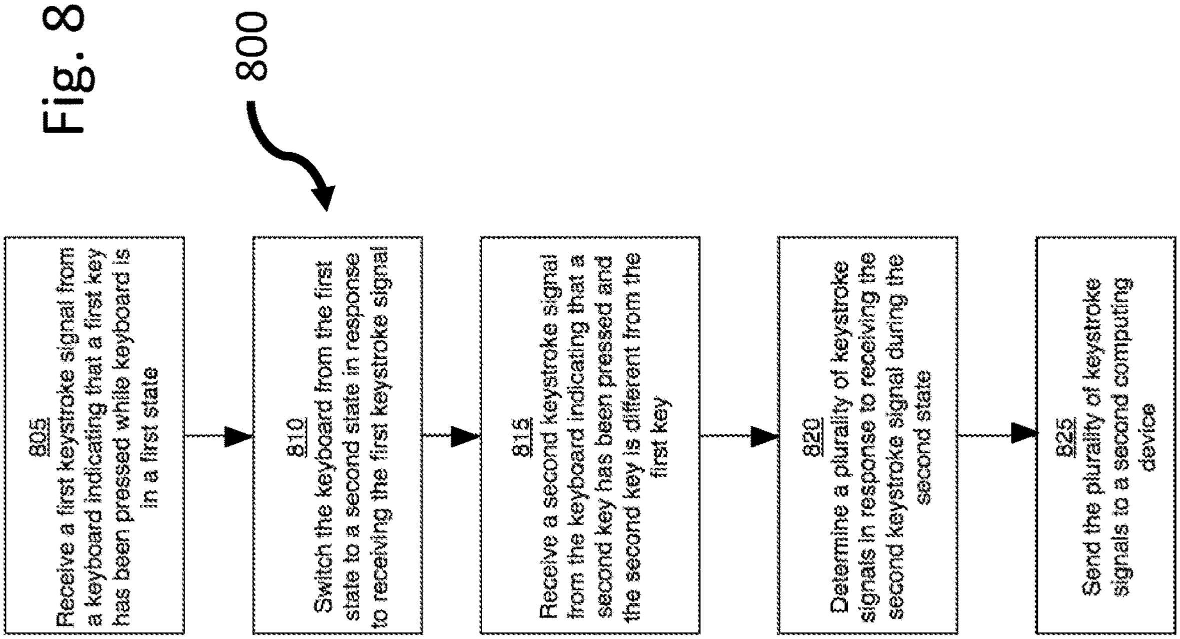
FIG. 8 shows a flow diagram for sending shortcuts with a multi-mode keyboard in accordance with an illustrative embodiment.

FIG. 8 shows a flow diagram 800 for sending shortcuts with a multi-mode keyboard in accordance with an illustrative embodiment. In alternative embodiments, fewer, additional, and/or different operations may be performed. Also, the use of a flow diagram is not meant to be limiting with respect to the order of operations performed. The flow diagram 800 shows, for example, processes for sending text strings or functions such as shown in FIGS. 7A and 7B and discussed herein. In an operation 805, the system receives a first keystroke signal from a keyboard indicating that a first key has been pressed. Prior to receiving the first keystroke signal, the keyboard operates in a first state. The first state is a normal state where keypresses cause a keyboard to send a keystroke correlated with a key pressed as disclosed herein.

In an operation 810, the system switches the keyboard from the first state to a second state in response to receiving the first keystroke signal. The second state may be, for example, a legal mode as disclosed herein. In an operation 815, the system receives, during the second state, a second keystroke signal from the keyboard indicating that a second key has been pressed. The first key is different from the second key.

In an operation 820, the system determines a plurality of keystroke signals in response to receiving the second keystroke signal during the second state. As disclosed herein throughout and discussed above with respect to FIGS. 7A and 7B, a plurality of keystroke signals may be a string of text, number of keystrokes, series, keystrokes associated with a function or alternate function, and the like. In other words, the plurality of keystrokes may be a number or series of keystrokes that can be determined and/or sent without specific keys associated with those individual keystrokes being pressed and/or depressed. In an operation 825, the system sends, during the second state, the plurality of keystroke signals to a second computing device. In this way, a user can enter a plurality of keystroke signals during a second mode/state by only pressing a single key on a keyboard, as disclosed herein throughout.

Figure 9:
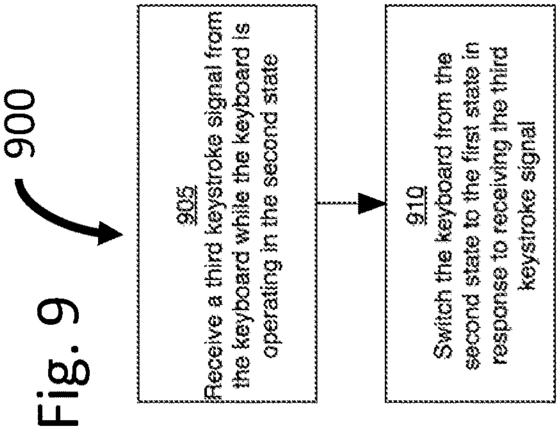
FIG. 9 shows a flow diagram for changing modes with a multi-mode keyboard in accordance with an illustrative embodiment.

FIG. 9 shows a flow diagram 900 for changing modes with a multi-mode keyboard in accordance with an illustrative embodiment. In alternative embodiments, fewer, additional, and/or different operations may be performed. Also, the use of a flow diagram is not meant to be limiting with respect to the order of operations performed. The flow diagram 900 demonstrates a process for switching back to a first mode when the keyboard is operating in a second mode. For example, if a keyboard is operating in a legal mode, a process for switching to a normal mode is described.

In an operation 905, the system receives, a third keystroke signal from the keyboard, wherein the third keystroke signal is received while the keyboard is operating in a second state. In an operation 910, the system switches the keyboard from the second state to the first state in response to receiving the third keystroke signal. The keystroke for switching the mode of the keyboard may be for example, a num lock key, but may also be any other key. In some embodiments, there may be different keys for switching modes of the keyboard (e.g., one key to switch to normal mode and one key to switch to legal mode). In some embodiments, the same key may be used to toggle between modes. In some embodiments, a keyboard may have more than two modes that are switched or toggled to with one or more keys.

Figure 10:
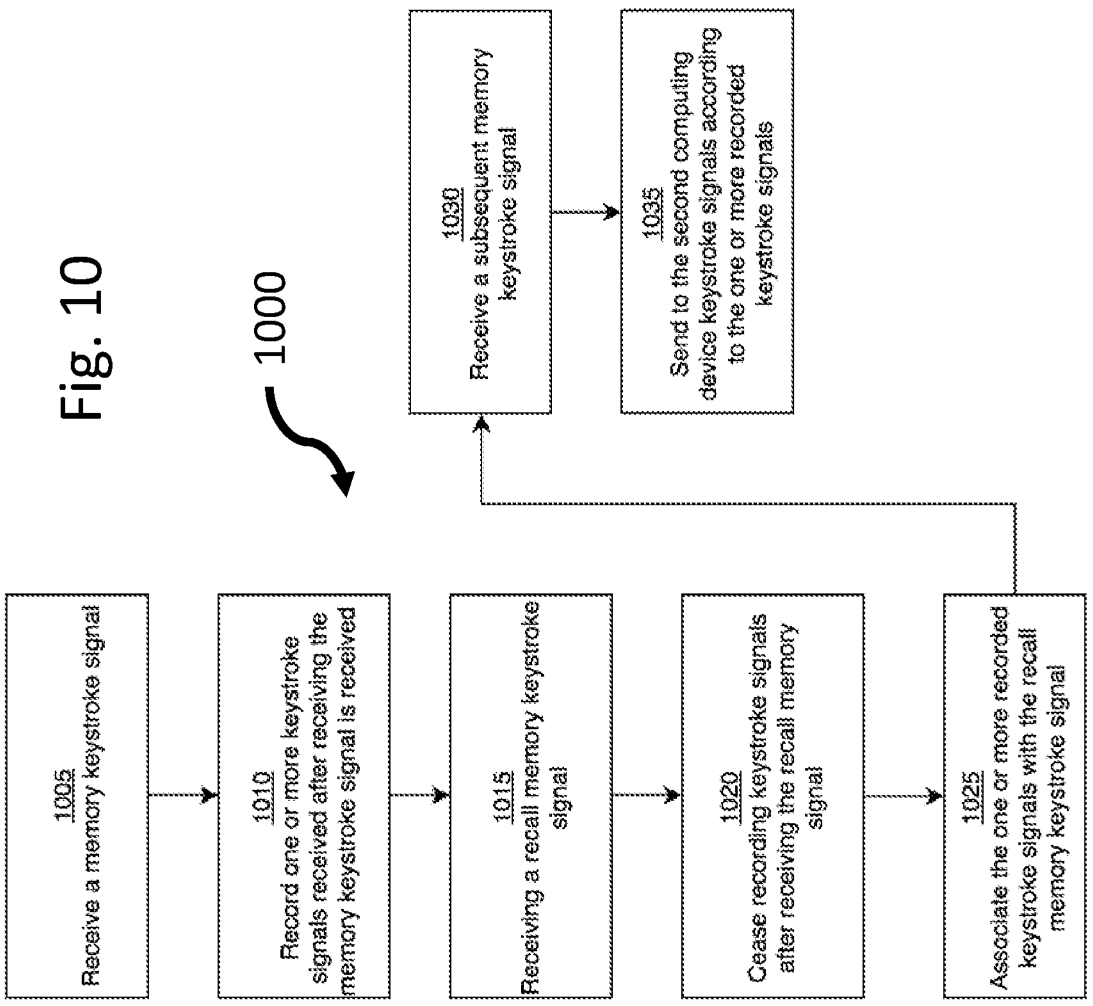
FIG. 10 shows a flow diagram for recording keystrokes and associating keystrokes with a memory button in accordance with an illustrative embodiment.

FIG. 10 shows a flow diagram 1000 for recording keystrokes and associating keystrokes with a memory button in accordance with an illustrative embodiment. In alternative embodiments, fewer, additional, and/or different operations may be performed. Also, the use of a flow diagram is not meant to be limiting with respect to the order of operations performed. The flow diagram 1000 describes a process for associating keystrokes with a memory button. One embodiment a process for associating keystrokes with a memory button is also described above with respect to FIGS. 7A and 7B.

In an operation 1005, the system receives, during a second state of a keyboard (e.g., legal mode), a memory keystroke signal. In an operation 1010, the system records one or more keystroke signals received after the memory keystroke signal is received. In an operation 1015, the system receives a recall memory keystroke signal. In various embodiments, the memory keystroke signal and the recall memory keystroke signal may be associated with a single memory key on the keyboard or may be associated with two separate keys on the keyboard such that a different key is pressed to initiate and cease recording of keystrokes for a recall memory button.

In an operation 1020, the system ceases recording of keystroke signals after receiving the recall memory keystroke signal. In an operation 1025, the system associates the one or more recorded keystroke signals with the recall memory keystroke signal. In an operation 1030, the system receives a subsequent memory keystroke signal. The subsequent memory keystroke signal may be received when the recall memory button is pressed (i.e., the subsequent recall memory keystroke signal is received when the recall memory button is pressed but the system is not recording keystrokes to be recorded into the memory). In other embodiments, the subsequent memory keystroke signal may be associated with a different button on the keyboard than the recall memory button. In an operation 1035, the system sends, to the second computing device, keystroke signals according to the one or more recorded keystroke signals.

Although the embodiments disclosed herein are not limited to particular hardware/software configurations, FIGS. 11-13 described below show various configurations in which the embodiments may be implemented.

Figure 11:
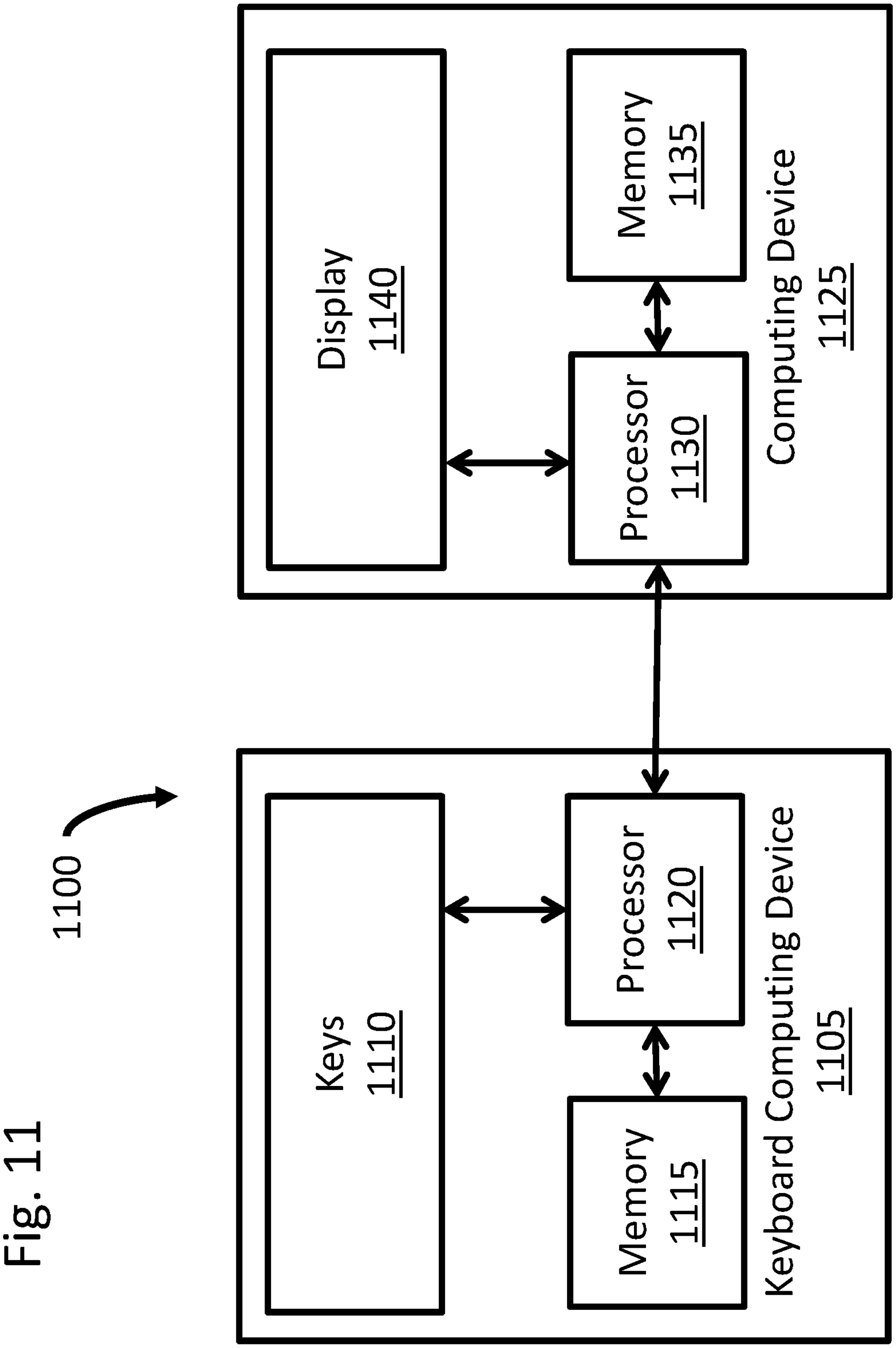
FIG. 11 shows a configuration of a multi-mode keyboard with an integrated processor and memory in accordance with an illustrative embodiment.

FIG. 11 shows a configuration 1100 of a multi-mode keyboard with an integrated processor and memory in accordance with an illustrative embodiment. A keyboard computing device 1105 has a memory 1115, processor 1120, and keys 1110. The keys 1110 can be pressed to send signals to the processor 1120, which is in communication with a processor 1130 of a computing device 1125. In one example, the computing device 1125 may be a personal computer that is capable of word processing and any other function. The communication between the keyboard computing device 1105 and the computing device 1125 may be through any mode, such as wireless, wired, etc. The keyboard computing device 1125 may connect to the computing device 1125 through a universal serial bus (USB) or any other type of suitable connection.

The memory 1115 and the processor 1120 may be built into a keyboard, such that an end user may not see a physical difference in shape or size of a keyboard due to the presence of the memory 1115 and the processor 1120 (i.e., the memory 1115 and the processor 1120 are integrated into the keyboard). The memory 1115 may have stored upon it instructions to execute the various systems and methods disclosed herein, which may be executed by the processor 1120.

The computing device 1125 includes the processor 1130, a memory 1135, and a display 1140. The processor 1130 may run software programs, such as word processing programs, on the computing device 1125. Such programs may include displays or user interfaces to be displayed on the display 1140. The computing device 1125 can therefore be responsive to keystroke signals sent from the keyboard computing device 1105, including individual keystrokes, text strings, functions, alternate functions, etc.

Figure 12:
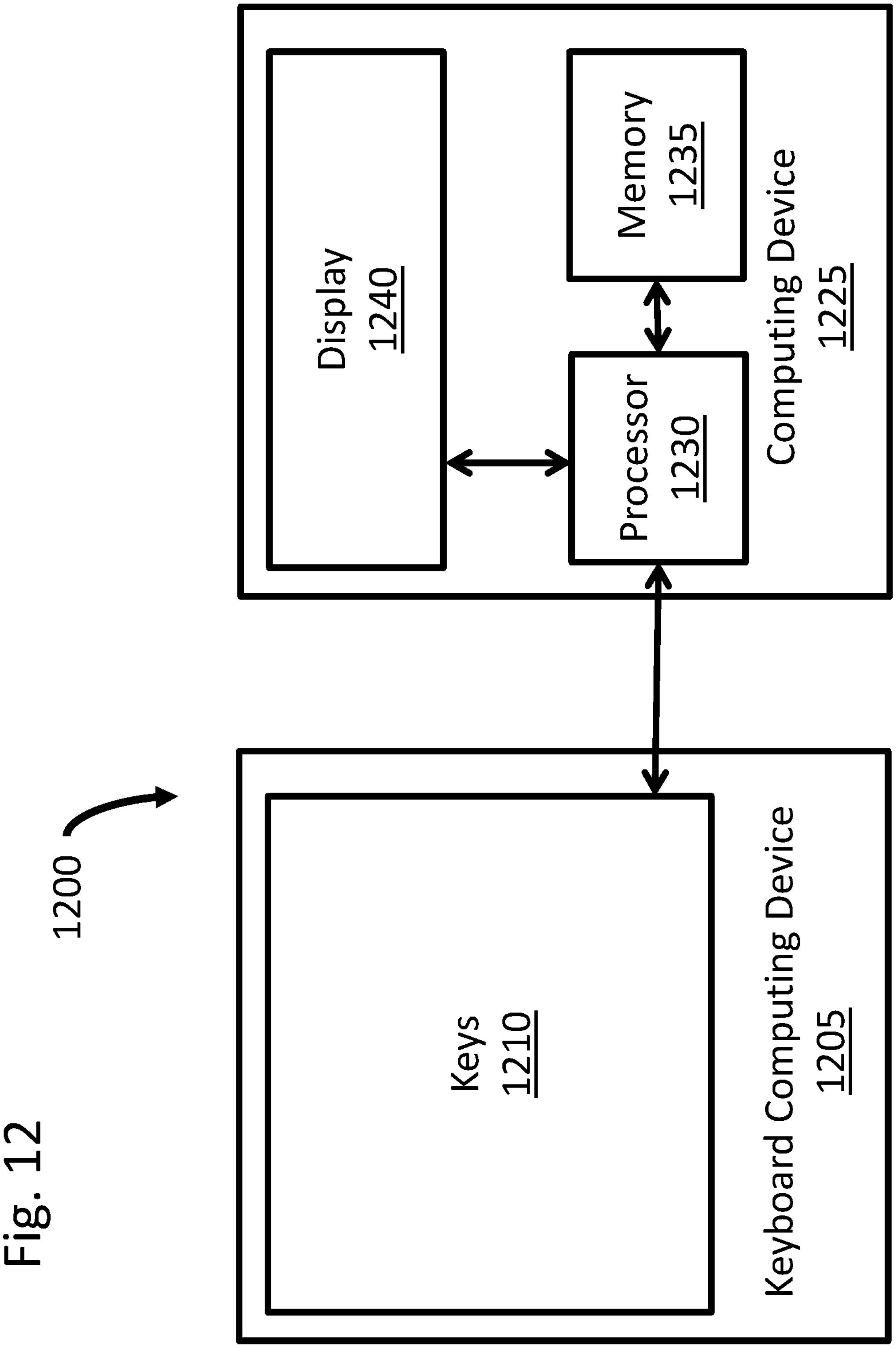
FIG. 12 shows a configuration of a multi-mode keyboard integrated with a second computing device in accordance with an illustrative embodiment.

FIG. 12 shows a configuration 1200 of a multi-mode keyboard integrated with a second computing device in accordance with an illustrative embodiment. A keyboard computing device 1205 includes keys 1210. A computing device 1225 includes a processor 1230, a memory 1235, and a display 1240. The computing device 1225 may be similar to the computing device 1125 of FIG. 11. However, the computing device 1225 also includes on its memory instructions to execute the systems and methods disclosed herein, which can be executed by the processor 1230. The processor 1230 can receive keystroke signals from the keys 1210 and switch between modes, execute functions, alternate functions, etc. as disclosed herein. In this embodiment, they systems and methods disclosed herein operate on the computing device where programs such as word processing are executed. Comparing FIG. 11 to FIG. 12, the keyboard computing device 1205 may be ignorant with respect to the systems and methods disclosed herein as they are executed on the computing device 1225. In FIG. 11, the systems and methods disclosed herein are executed on the keyboard computing device 1105, and the computing device 1125 may be ignorant with respect to the systems and methods disclosed herein. Advantageously, this allows the systems and methods disclosed herein to be executed with only one device that is different from a typical device (i.e., a specialized keyboard may be used as in FIG. 11 or a specialized computer may be used as in FIG. 12). In other embodiments, the systems and methods disclosed herein may be executed partly on a computer and partly within a keyboard using the configuration of FIG. 11. FIG. 13, as shown below, demonstrates a separate device such that, advantageously, a typical keyboard and computer may be used to implement the systems and methods disclosed herein.

Figure 13:
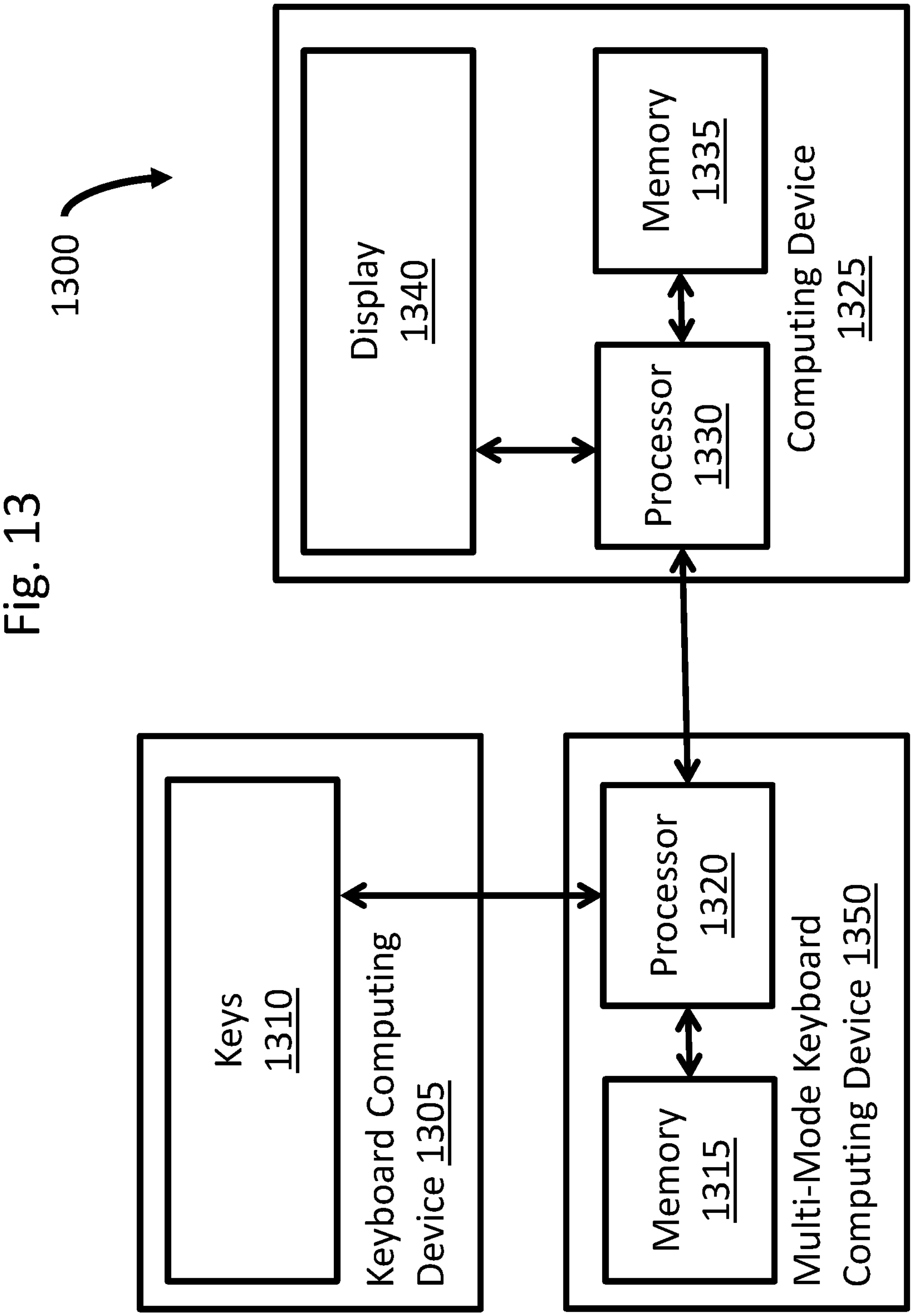
FIG. 13 shows a configuration of a multi-mode keyboard with an independent processor and memory in accordance with an illustrative embodiment.

FIG. 13 shows a configuration 1300 of a multi-mode keyboard with an independent processor and memory in accordance with an illustrative embodiment. A keyboard computing device 1305 includes keys 1310 that can send keystroke signals to a multi-mode keyboard computing device 1350. The multi-mode keyboard computing device 1350 includes a processor 1320 and a memory 1315. The memory 1315 stores instructions for execution, by the processor 1320, that include the systems and methods disclosed herein. In this way, keystrokes can be sent from the keyboard computing device 1305 to the multi-mode keyboard computing device 1350, and the multi-mode keyboard computing device 1350 can determine what keystrokes to send to a computing device 1325. The computing device 1325 may be similar to the computing devices 1125 and 1225 of FIGS. 11 and 12, respectively. The computing device 1325 includes a processor 1330, a memory 1335, and a display 1340.

The embodiment shown in FIG. 13 advantageously allows a typical keyboard and computing device to be used, with a plug and play type device in the intervening communications. For example, a keyboard may plug into the multi-mode keyboard computing device 1350, and the multi-mode keyboard computing device 1350 may in turn plug into a computing device, such that the systems and methods disclosed herein can be executed.

Other functions may be assigned to keys for a mode for a multi-mode keyboard. Such functions may be primary or alternate functions. For example, a key may be associated with a start outline function. The key could also be used to determine an outline hierarchy level similar to the predetermined thresholds of time described above for line spacing functions (e.g., hit it once, twice, three times etc. for different levels). Similarly, functions for alignment of paragraphs may be used (e.g., right, left, center, justify).

In some embodiments, a key may be used to insert a block quote. For example, hitting a key to insert a block quote during a particular mode of the keyboard may send keystrokes for functions to justify a paragraph, set the spacing of the paragraph to single space, and set margins in accordance with a block quote (e.g., one (1) inch margins).

Additional buttons may be added for other functions related to tracking changes. For example, buttons may exist to move to the next or previous change/comment function, a button for accepting a change, a button for rejecting a change, and/or a button for deleting a comment.

In various embodiments, a button on the keyboard may send keystrokes associated with a right mouse click. In various embodiments, they system may also send keystrokes associated with a right mouse click as part of calling another function available on a right click menu. Such menu may appear at a cursor and/or pointer location, such that functions called could be executed at the location of a cursor and/or pointer. Similarly, an alt button may also be used to access menus and more functions as part of automatic keystroke signals sent from the system disclosed herein.

Lights or other indicator on a keyboard may be used for various purposes. For example, an LED light indicator on a keyboard may blink when the system is recording keystrokes for a memory button. The lights may be used for any other purpose as well.

The systems and methods may also listen for phrases that are typed often. For example, a user may often type the phrase "United States of America." The system may recognize this string of keystrokes being repeated in sequence often. The system may then ask if the user, through a display of a computing device, if they would like to program that text string into the memory such that it can be reproduced by pressing a single key as disclosed herein. The user may be able to confirm or cancel this request with a particular keystroke or mouse click. In one embodiment, the system may ask this question by outputting a text string so that it is displayed on a computing device. Once the user has answered the question, the system may delete the text string automatically using keystrokes of the delete button or a function to highlight the inputted text and then delete it. In another embodiment, the system may pop up a dialog box to ask the question. If a user would like to save the text string, the system could do it automatically, or the system could walk the user through the steps for programming the button themselves.

In another embodiment, a memory button may be programmed to take advantage of states and predetermined thresholds of time as discussed above with respect to line spacing functions. For example, a recall memory button may be programmed to reproduce the text "Franklin" if it is pressed once, reproduce "Franklin Roosevelt" if it is pressed twice within a threshold of time, or reproduce "Franklin Delano Roosevelt" if it is pressed three times within a threshold of time.

In various embodiments, the methods and systems disclosed herein may exist as a standalone software application on a computing device or may be integrated into another software application, such as Microsoft Word™ or the Microsoft Office™ suite of software products. Such a program may include additional functionality, such as the ability to track a state of a function (e.g., know when bolding text function is on). This may be useful if a user wants a button that makes sure bold functionality is on, as opposed to a button that just toggles the bold function. In some embodiments, a call may be sent to determine the state of the software application. In other embodiments, calls may be made to further configure the systems and methods disclosed herein so that the proper functions/keystrokes can be sent. For example, a call to a computing device may determine whether a computing device is an Apple™, personal computer (PC), etc., so that it knows how to determine states, modes, functions, etc. In some embodiments, user inputs may be used to determine what type of computing device is being used. For example, a prompt may have a user indicate whether they are using an Apple™ computer or a PC.

In various embodiments, a user may also be able to determine what type of secondary mode they would like to use (e.g., engineer keys, foreign language, mathematician, any other career). The design of symbols of the keys of a keyboard may also be configured to change based on the mode the keyboard is set to, such that it can be used efficiently by a user regardless of what mode they have chosen. In some embodiments, different keyboards or interchangeable keys may be used so that different keyboard modes designated to a software program can be easily used. Software may also be updated in order to accommodate new versions of software applications such as Microsoft Word™.

The memory of the devices disclosed herein may be volatile or non-volatile. Non-volatile memory may be used so that recorded states, modes, keystrokes, etc. may be retained even if a device powers down. A device as disclosed herein may also include a button for a hard restart, clearing the memory and resetting it. A button or switch other than a key of a keyboard may also be used to switch a keyboard between modes (e.g, dipswitch).

Embodiments may also highlight or select certain areas of text to execute certain functions. Such a function may be useful, for example, if a user wants to format a certain area of text. For example, a system may query a user how many characters/paragraphs/sentences/words to apply a formatting to. In another example, the system may use a state machine to automatically know that a number after a certain command refers to how many characters/paragraphs/sentences/words to apply something to. For example, the system may receive a keystroke associated with a highlight format button. The system may then query "how many words after (or before) the cursor would you like to format with a highlight?" The user may press the number key seven (7). The system then highlights the next or previous 7 words (which can or cannot include a word where the cursor is, which could also be queried or an optional setting).

A system may also use a command or Windows™ button to access controls, functions, etc. within a computer's operating system, file system, documents, etc.

In some embodiments, a memory button may be used to store highlighted text. In this embodiment, a user may highlight a paragraph and push a memory button. The system may then record the text in the highlighted paragraph. Then, when the memory button is recalled, the system can reproduce the entire paragraph. In this way, a user can store multiple text strings without having to type them out, and recall them without taking their hands off the keyboard.

Another function that may be used by the system is to send a shift keystroke and F3 keystroke to change the capitalization of a highlighted text. As disclosed herein, the system may also be utilized to automatically highlight text. Other functions which may be utilized/input with a single key by the systems and methods disclosed herein may include insert hyperlink, insert table of contents, adjust table of contents level, insert reference to table of contents, page and/or section break, number of columns, add draft and/or watermark stamp, toggle into or out of header/footer, new document, save, save as, print, print to portable document format (PDF), or any other function.

Figure 14:
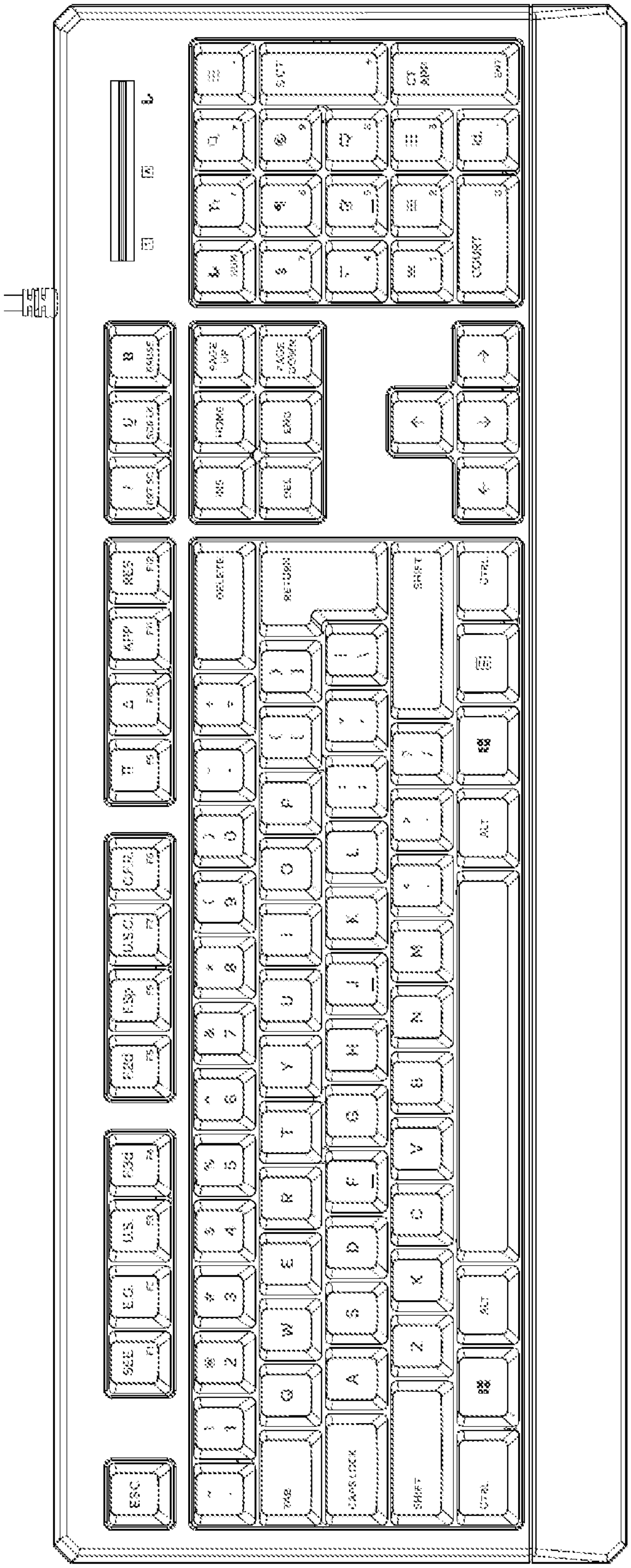
FIGS. 14-84 show ornamental keyboard layouts in accordance with various illustrative embodiments.
Figure 15:
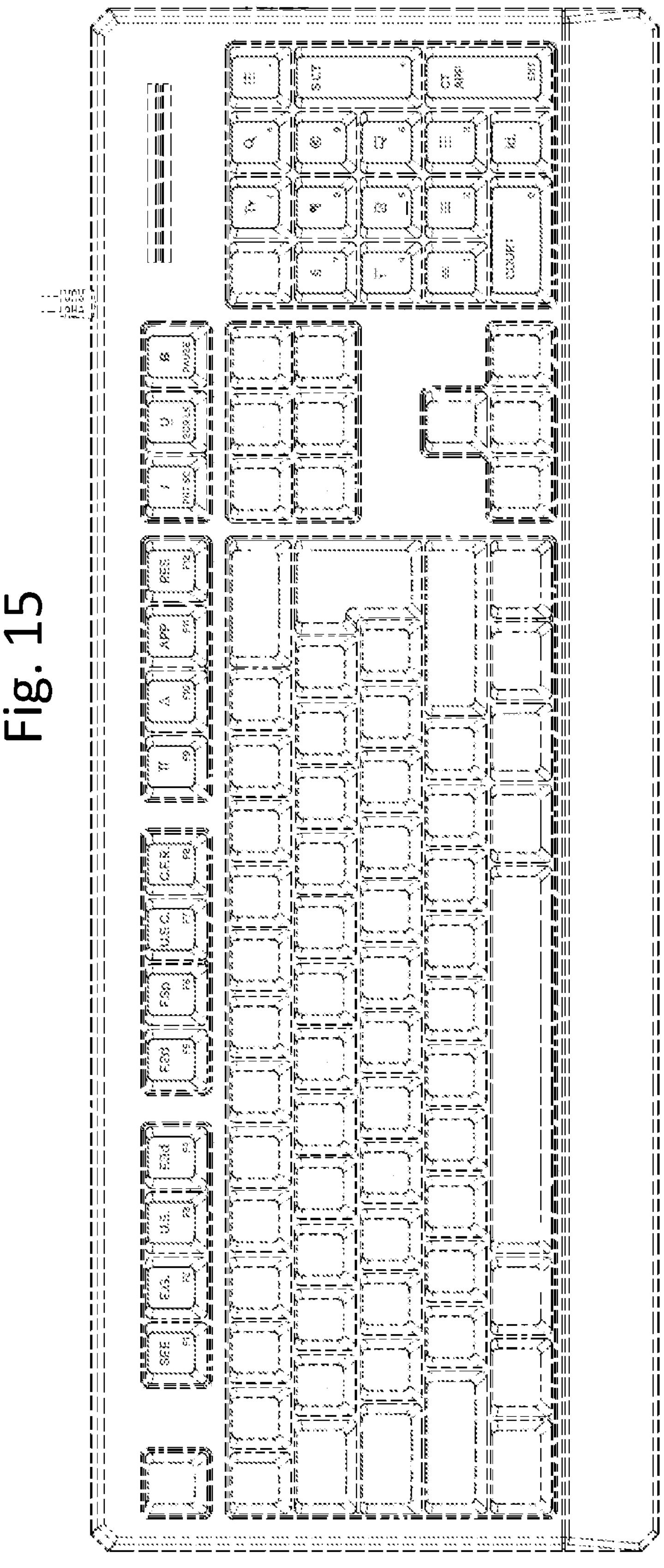
Figure 16:
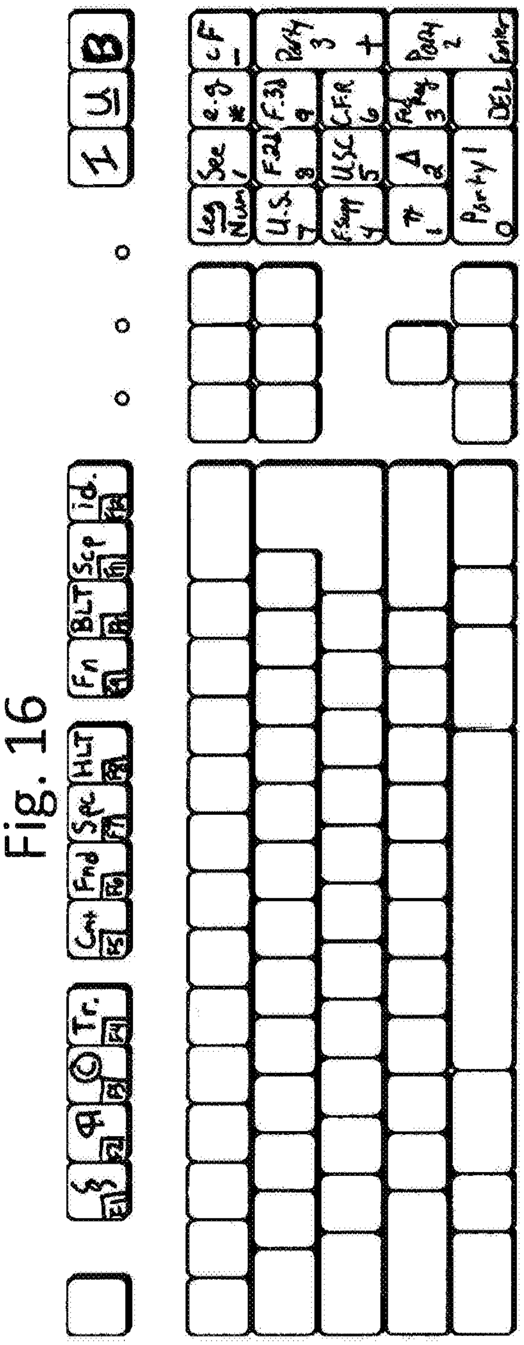
Figure 17:
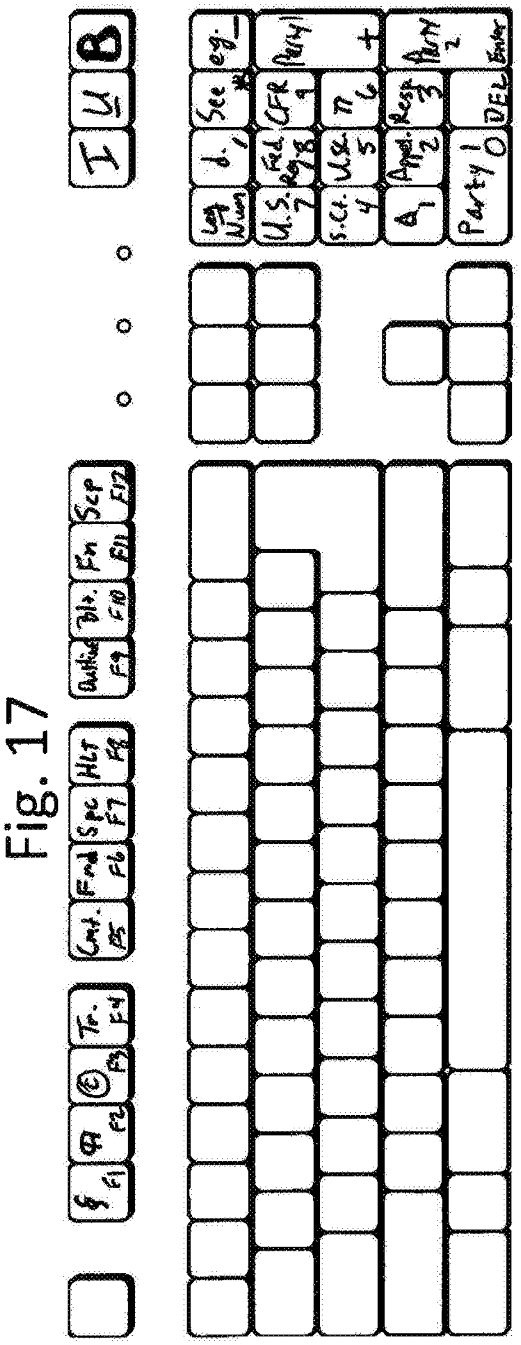
Figure 18:
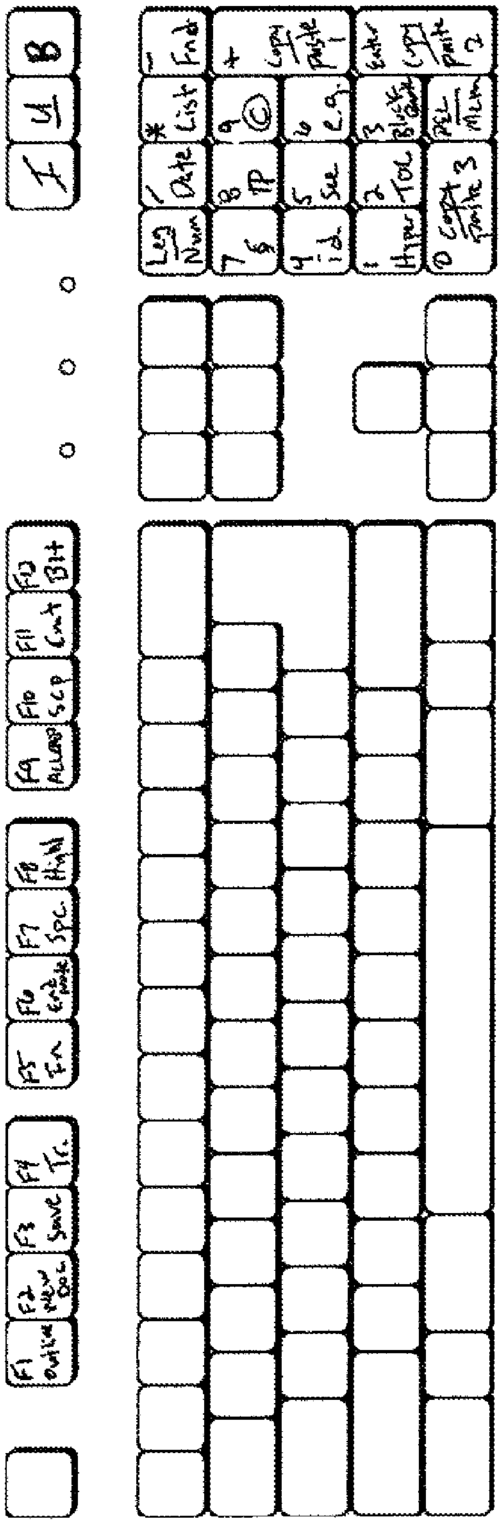
Figure 19:
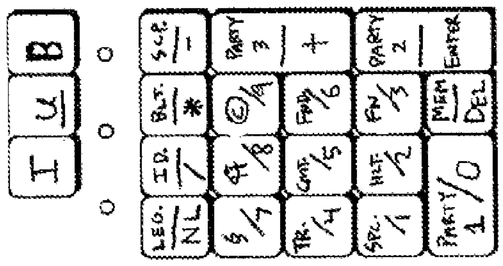
Figure 20:
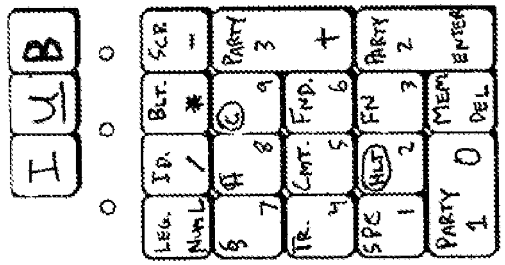
Figure 21:
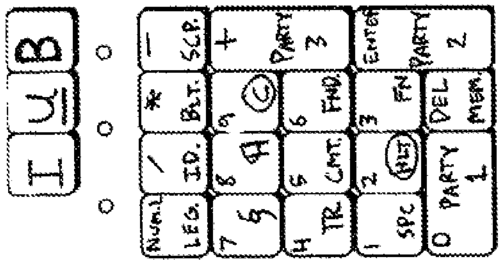
Figure 22:
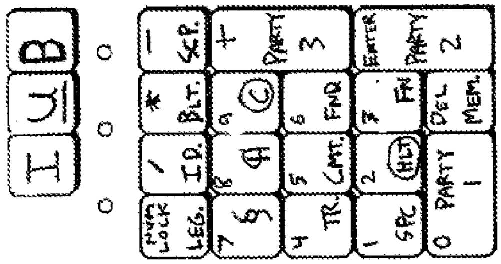
Figure 23:
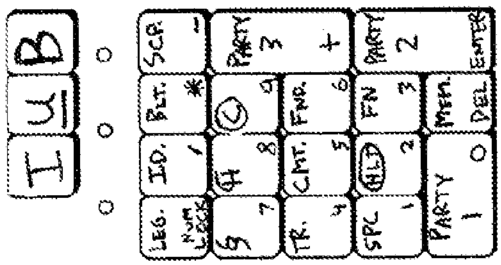
Figure 24:
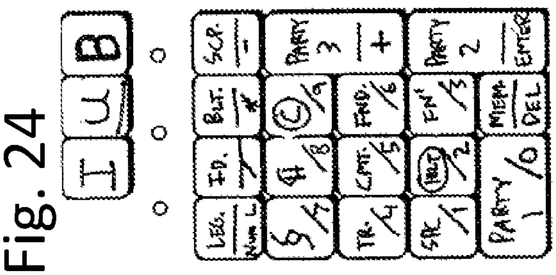
Figure 25:
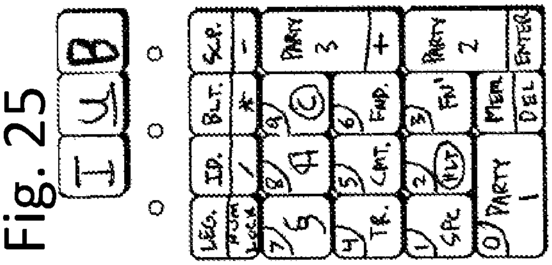
Figure 26:
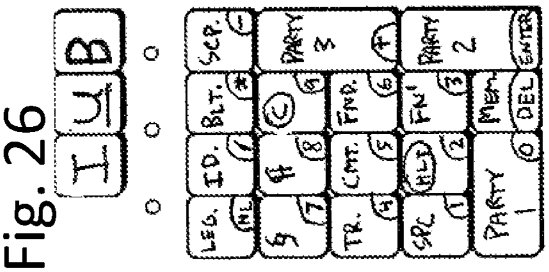
Figure 27:
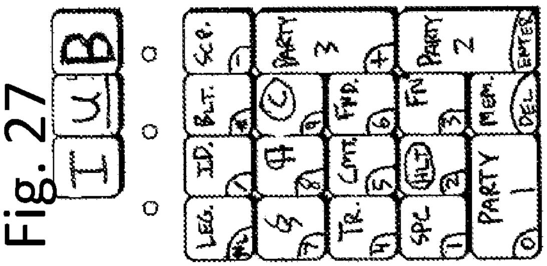
Figure 28:
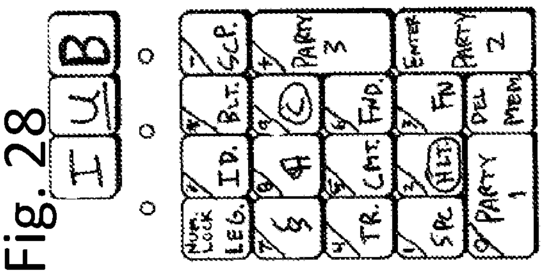
Figure 29:
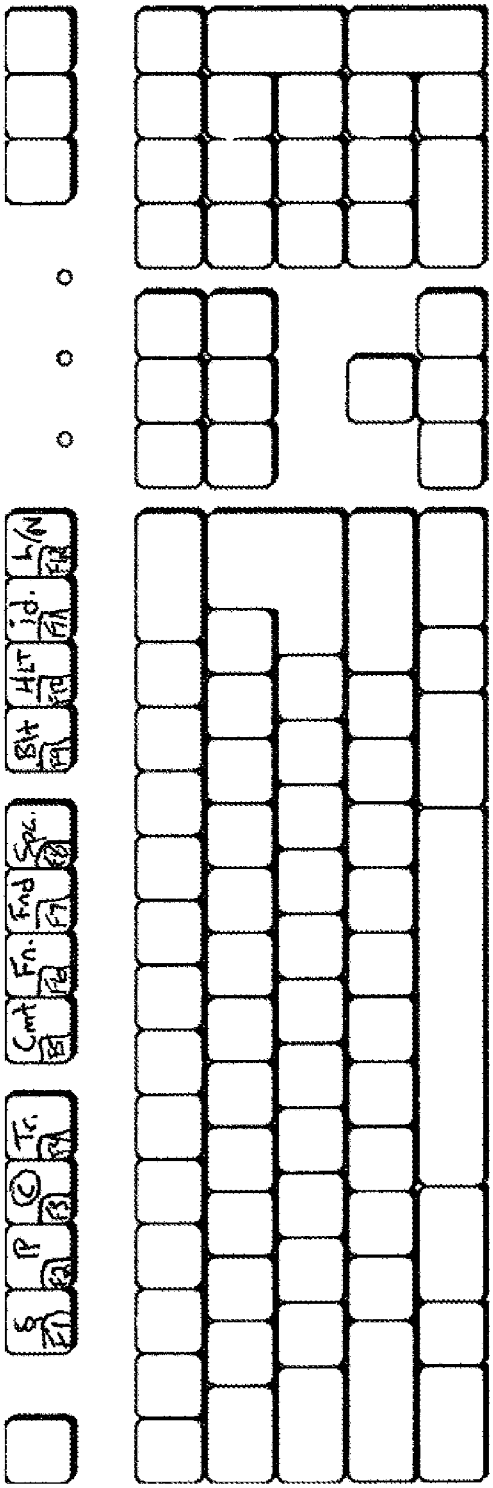
Figure 30:
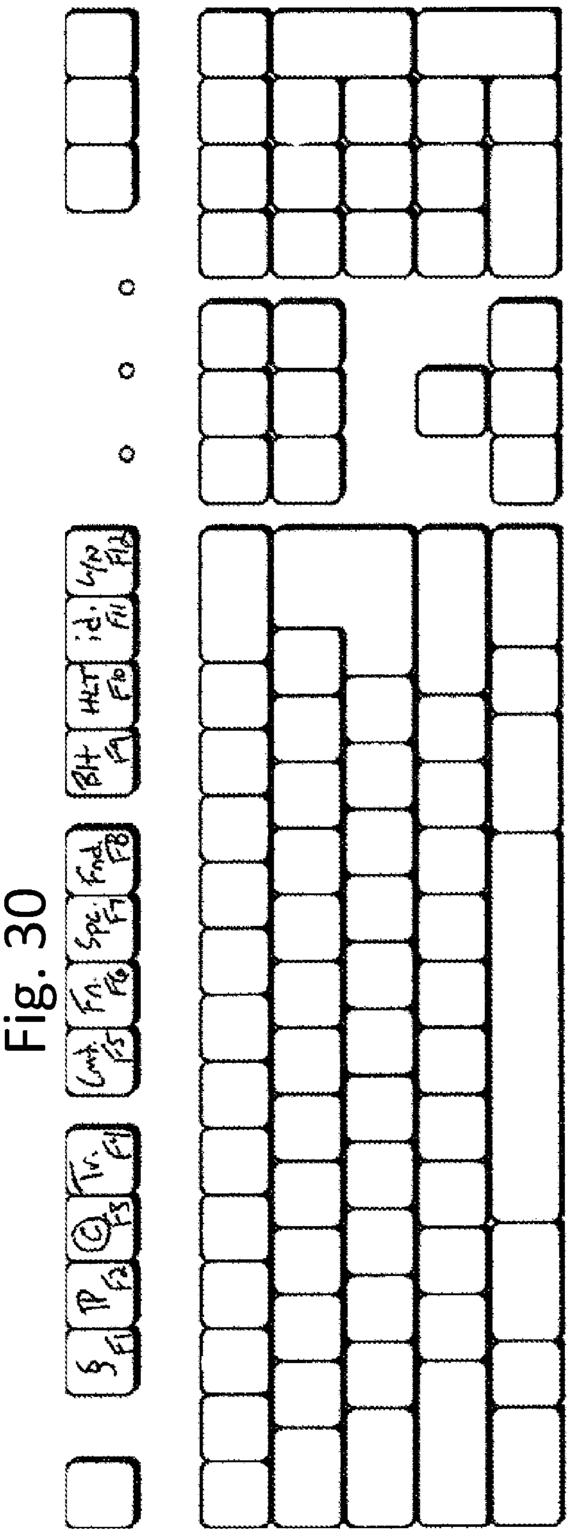
Figure 31:
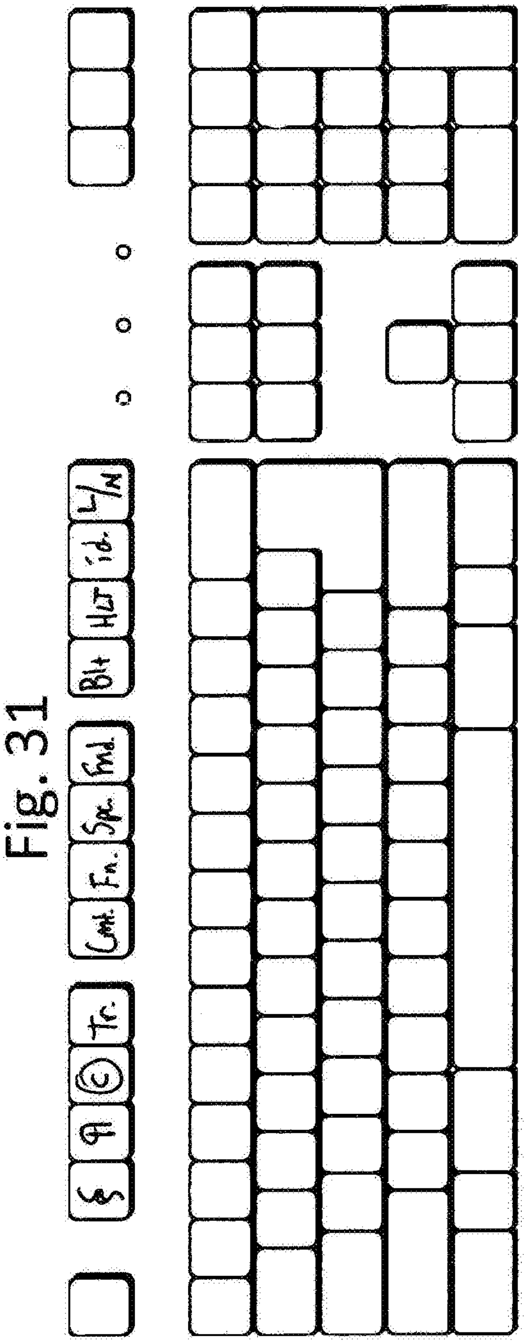
Figure 32:
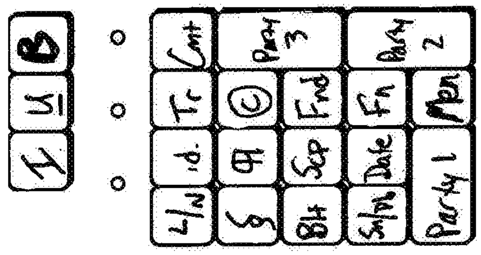
Figure 33:
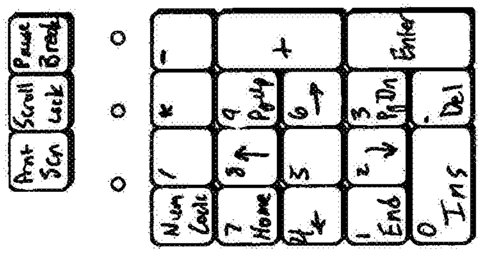
Figure 34:
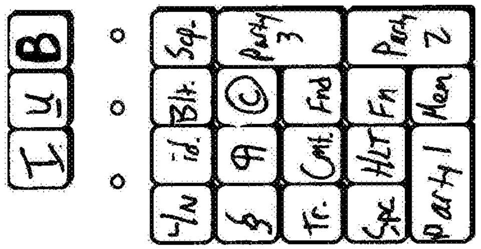
Figure 35:
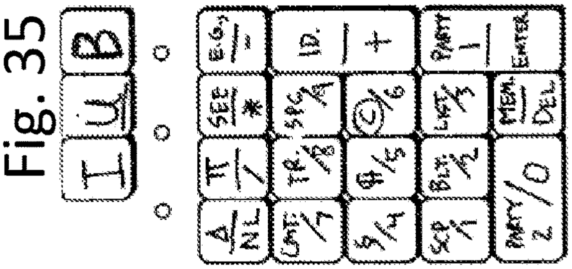
Figure 36:
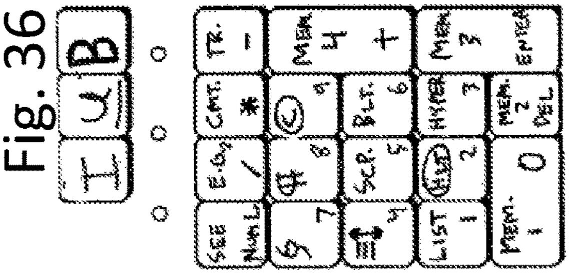
Figure 37:
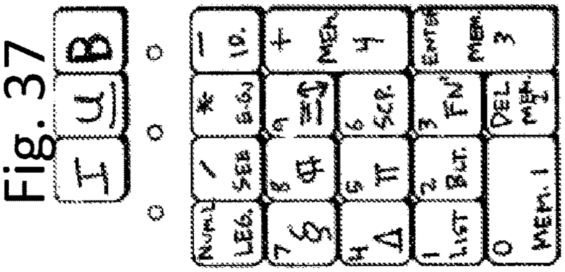
Figure 38:
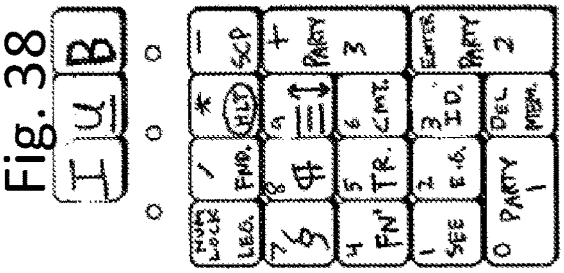
Figure 39:
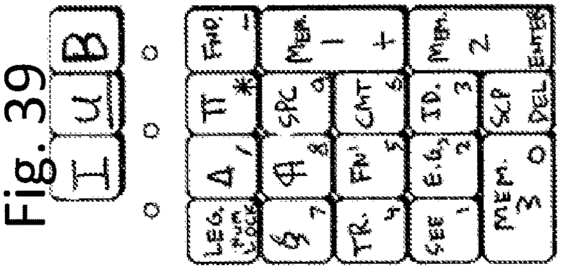
Figure 40:
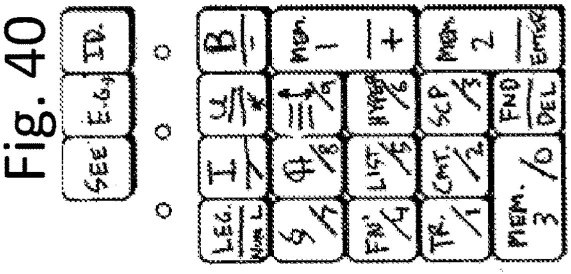
Figure 41:
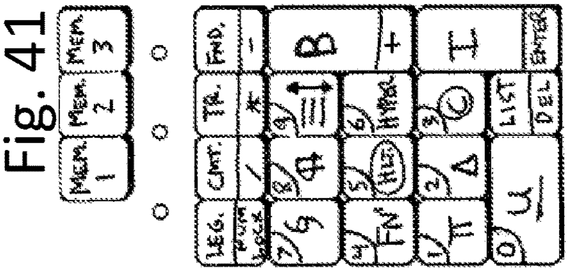
Figure 42:
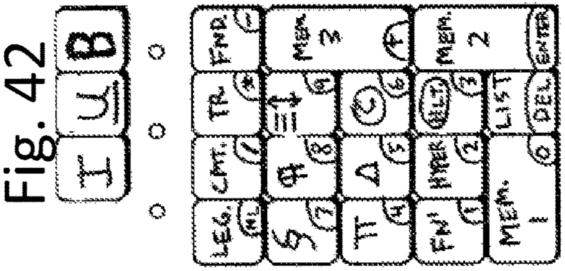
Figure 43:
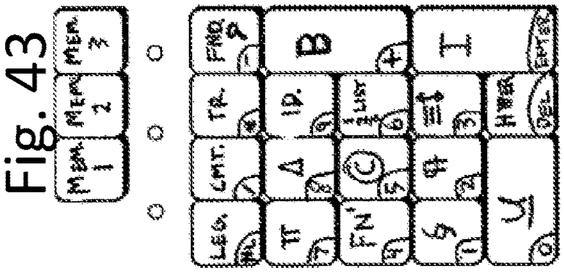
Figure 44:
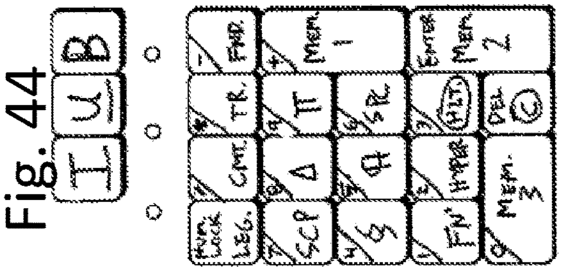
Figure 45:
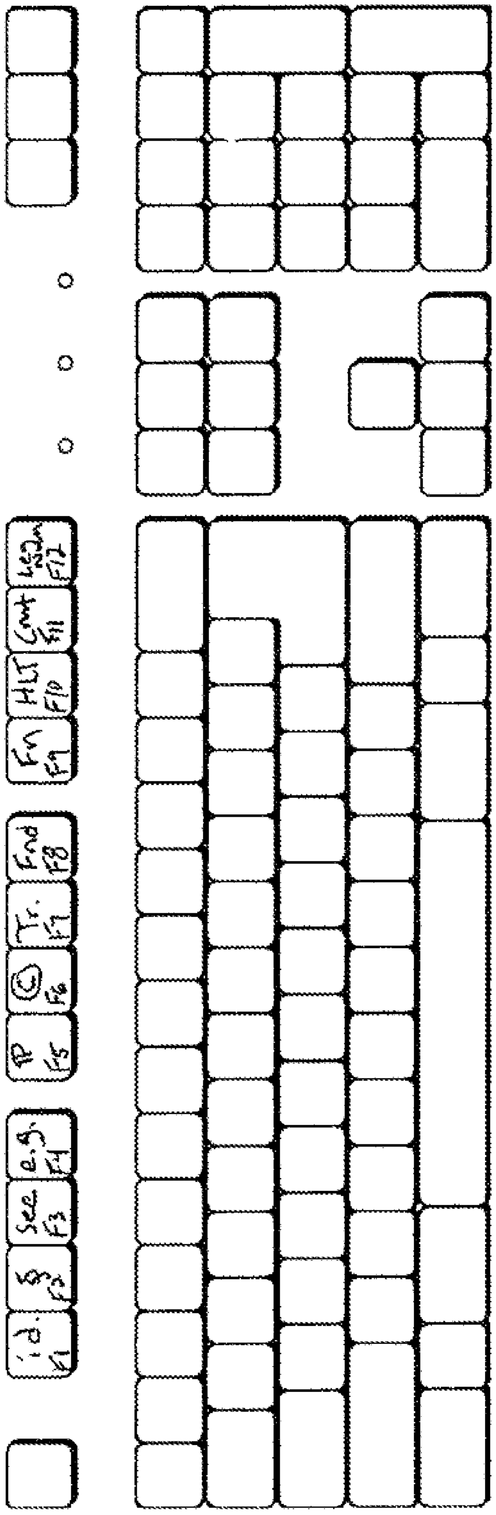
Figure 46:
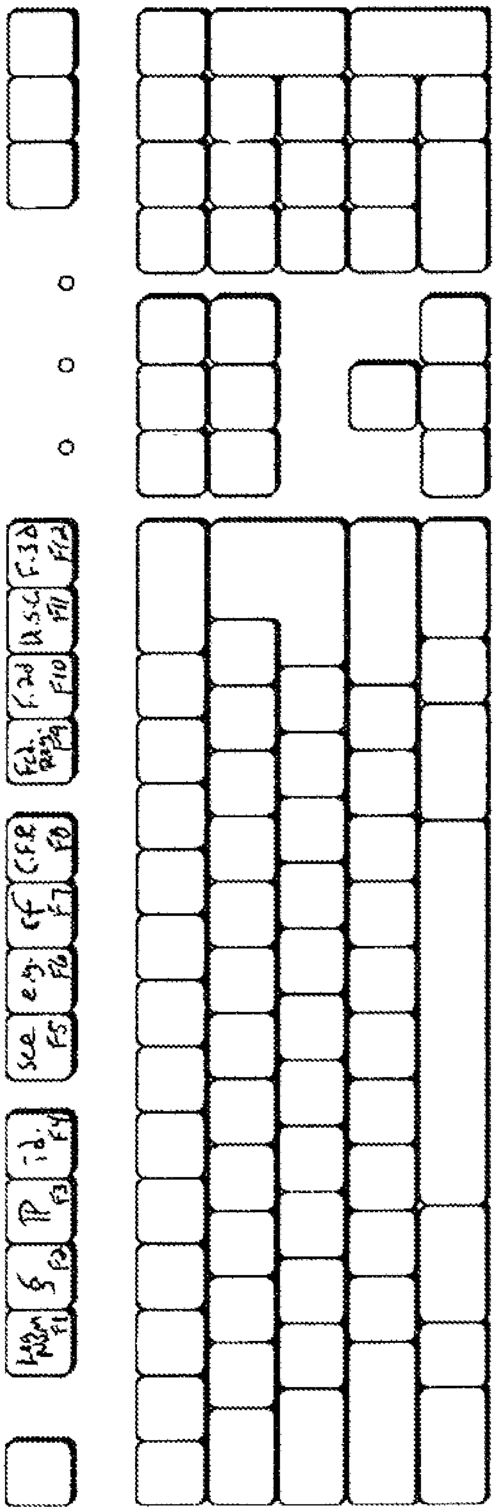
Figure 47:
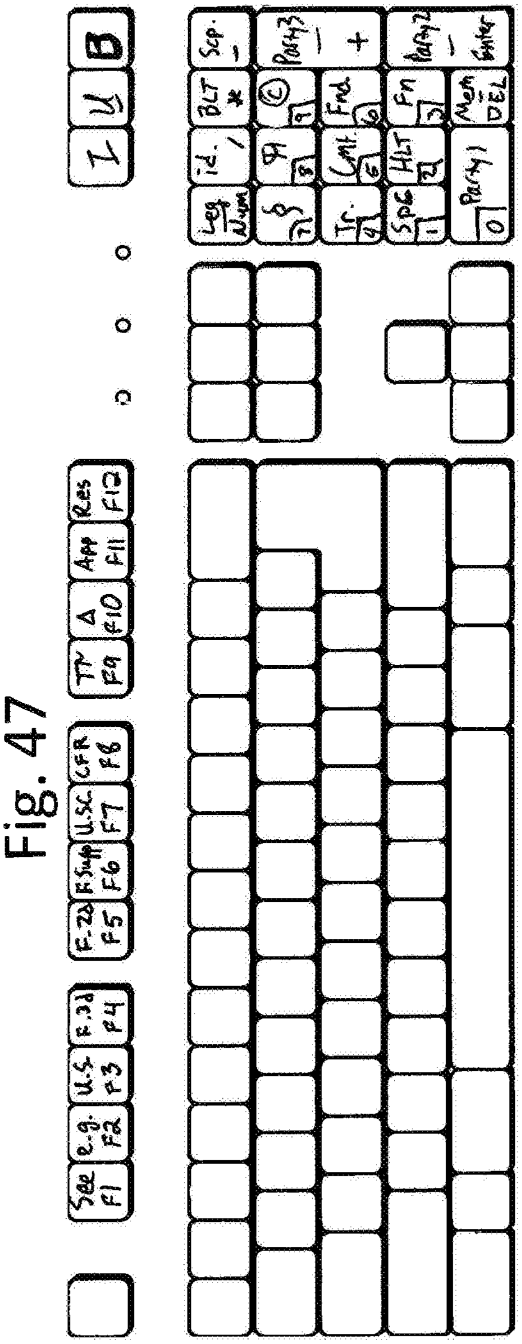
Figure 52:
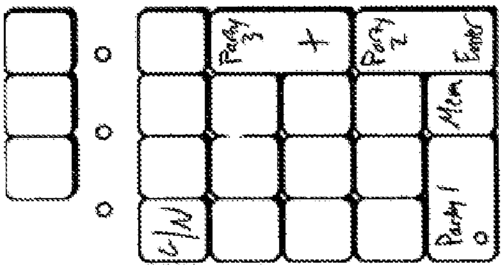
Figure 51:
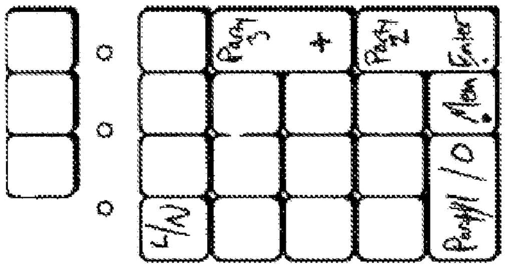
Figure 50:
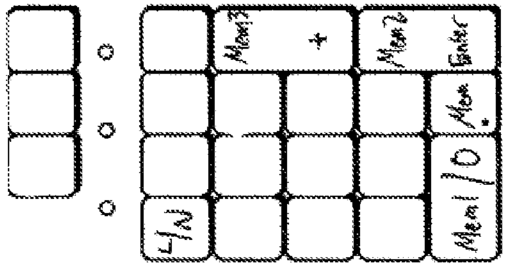
Figure 49:
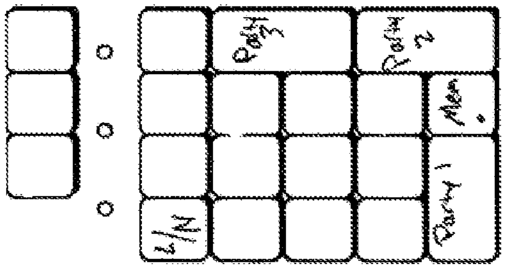
Figure 48:
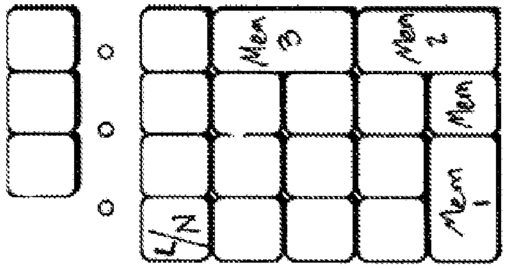
Figure 57:
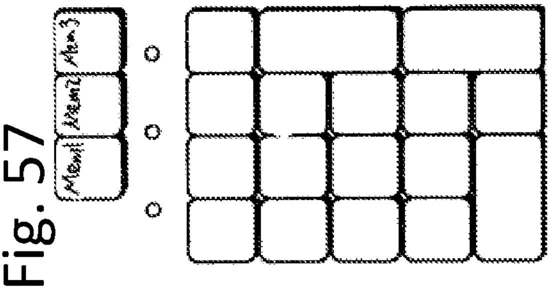
Figure 56:
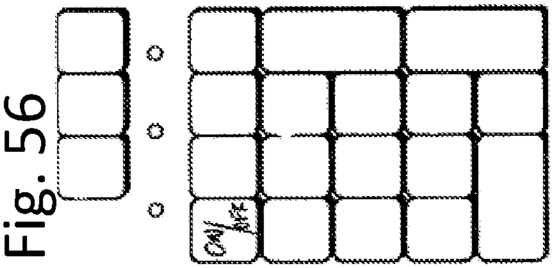
Figure 55:
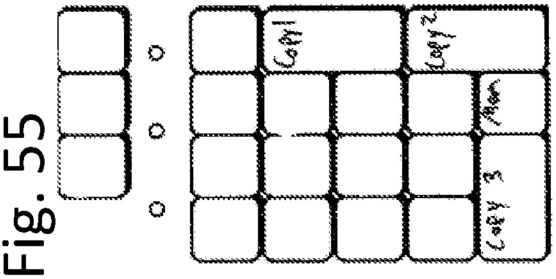
Figure 54:
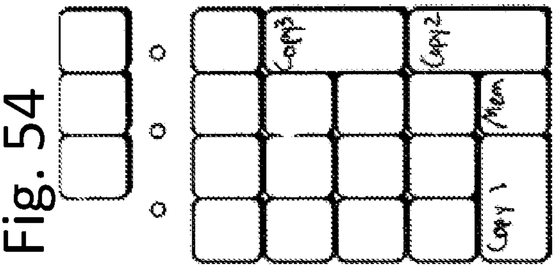
Figure 53:
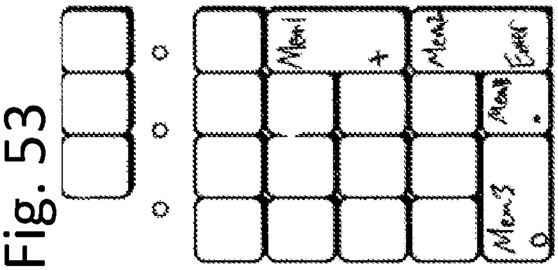
Figure 58:
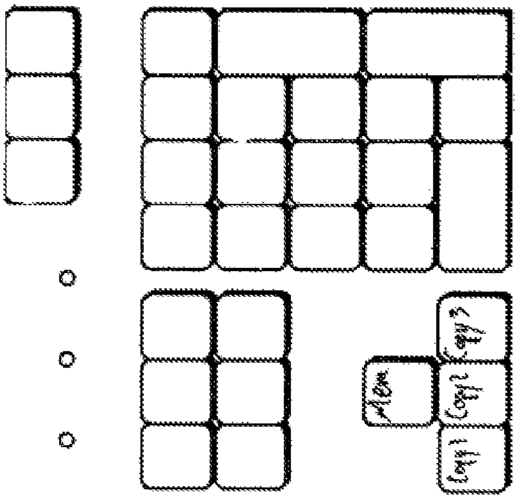
Figure 59:
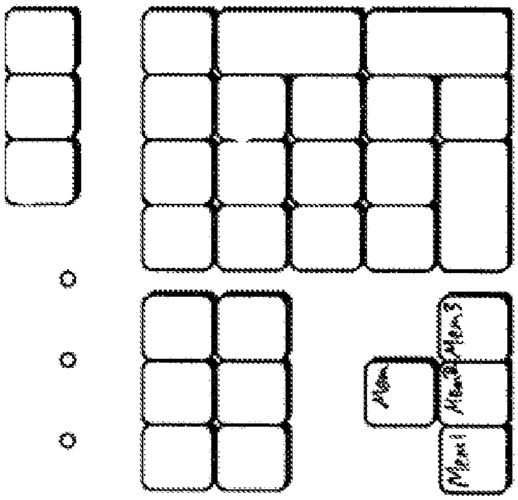
Figure 60:
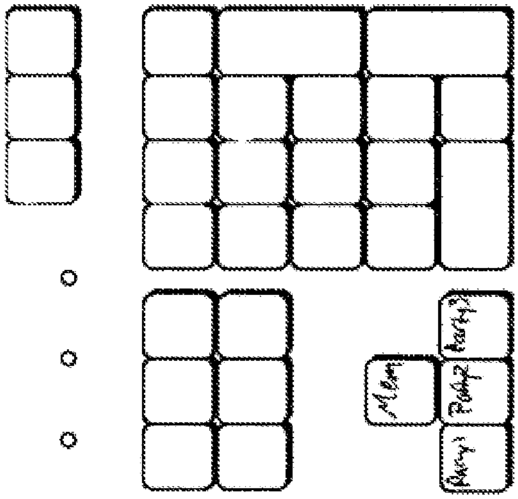
Figure 61:
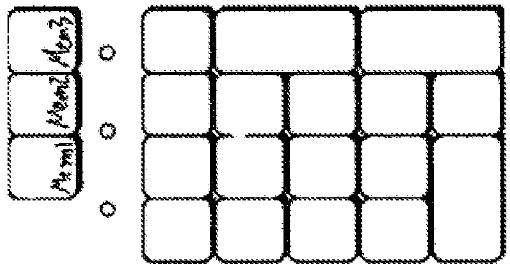
Figure 62:
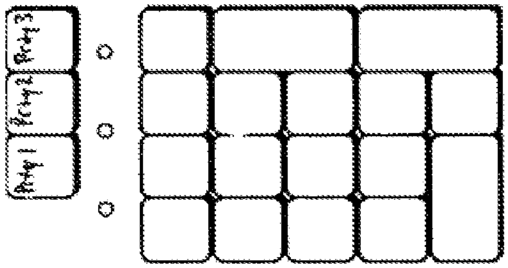
Figure 63:
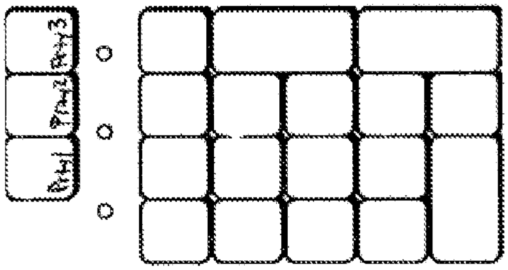
Figure 64:
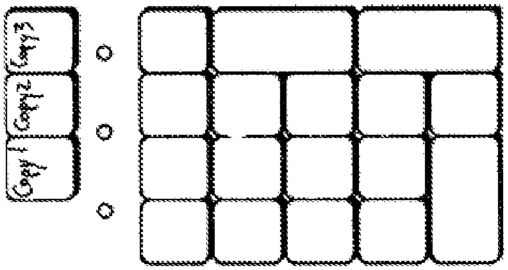
Figure 65:
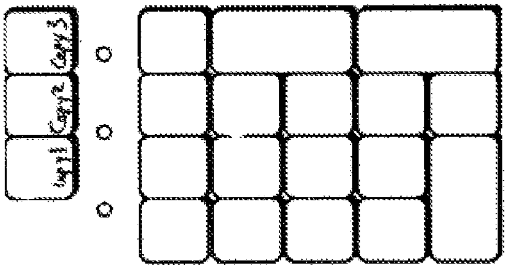
Figure 66:
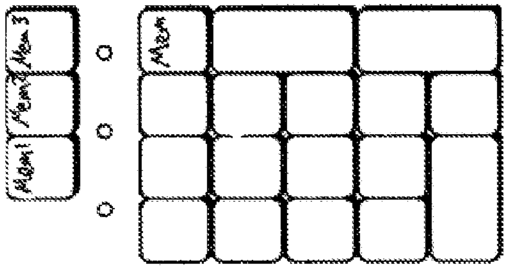
Figure 67:
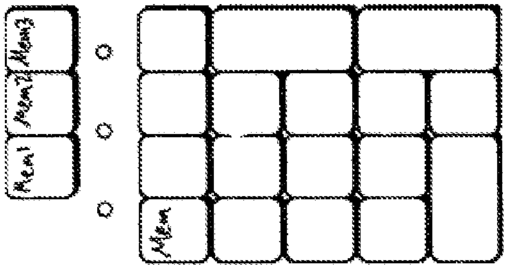
Figure 68:
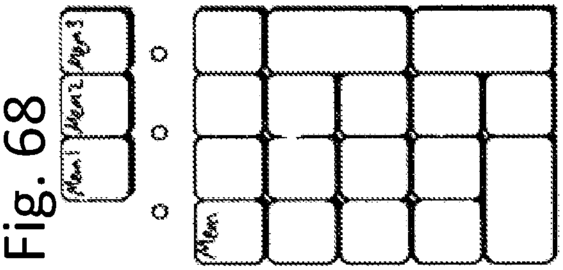
Figure 69:
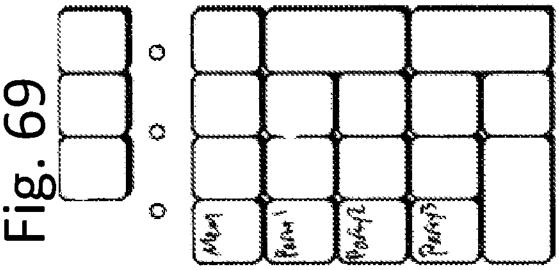
Figure 70:
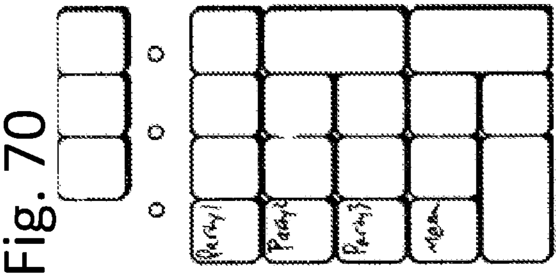
Figure 71:
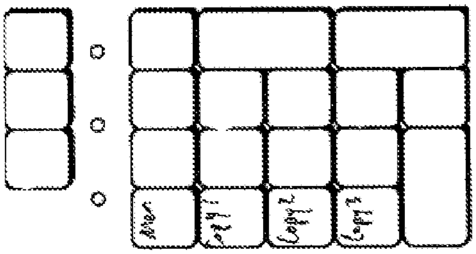
Figure 72:
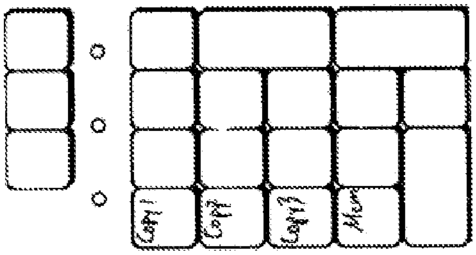
Figure 73:
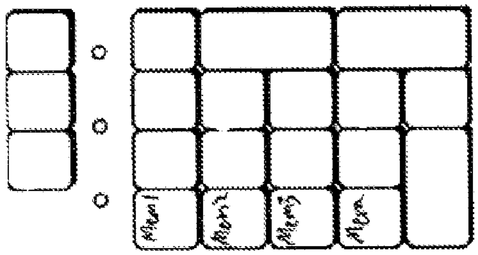
Figure 74:
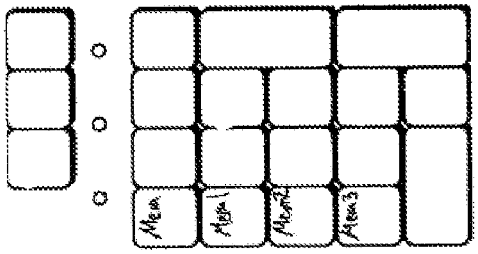
Figure 75:
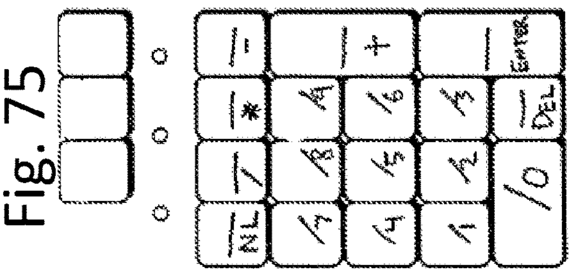
Figure 76:
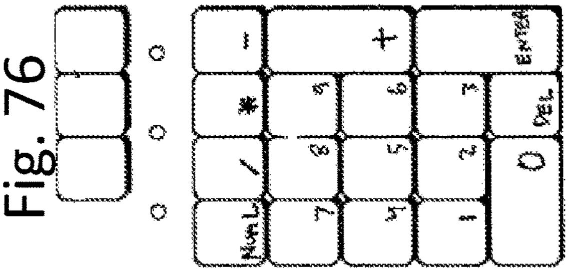
Figure 77:
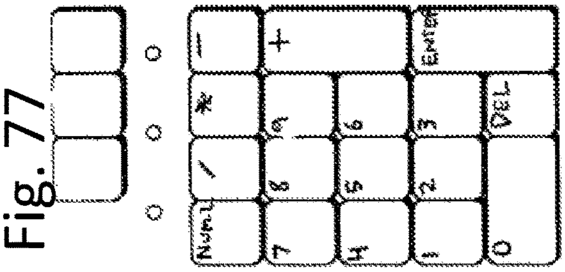
Figure 78:
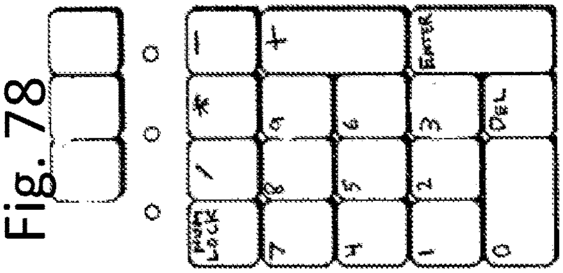
Figure 79:
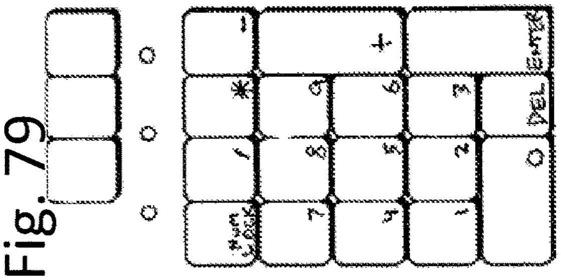
Figure 80:
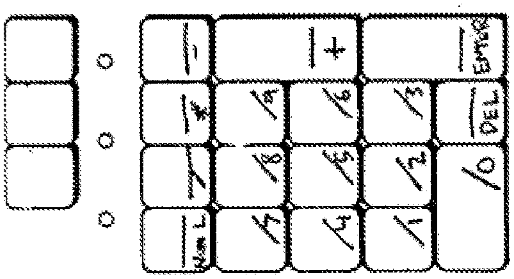
Figure 81:
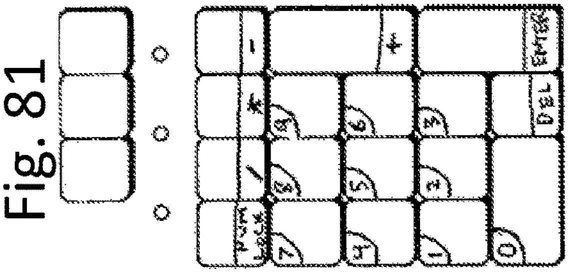
Figure 82:
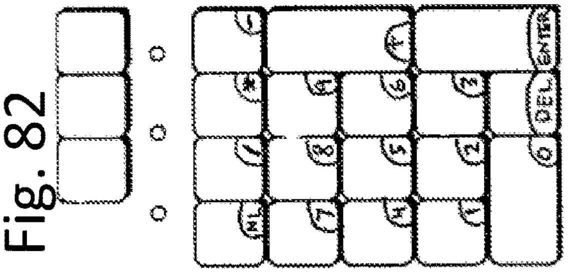
Figure 83:
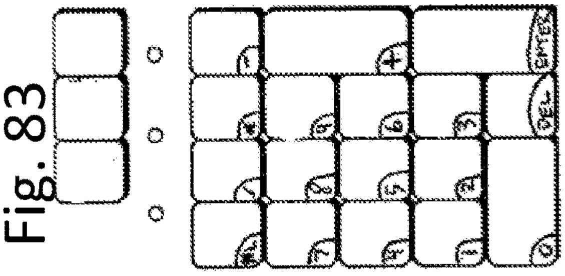
Figure 84:
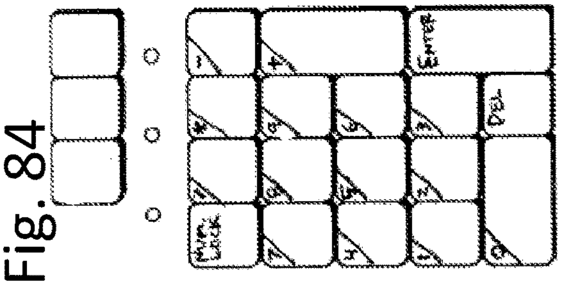

FIGS. 14-84 show ornamental keyboard layouts in accordance with various illustrative embodiments. For example, FIG. 14 shows a full keyboard with symbols on the keys for both a normal and legal mode as disclosed herein. FIG. 15 shows a top view of a keyboard, showing an example of a keyboard that can be plugged into a computer for use as an input device. The ornamental design shown in FIG. 15 is understood to consist only of the top surfaces of the thirty-one (31) keys that are shown with solid lines and the graphics appearing thereon, while all other broken lines are directed to the environment and form no part of the claimed design. In other words, for the particular ornamental design shown in FIG. 15, the keys may be in any shape, and the keys without symbols shown may have any symbol thereon or be in any configuration. Any of the ornamental designs disclosed herein, including FIGS. 1-6 and 14-84 may be configured in various combinations, substitutions, etc. of each other, such that the only part of the ornamental design specifically disclosed is the surface of keys that are shown with graphics appearing thereon.

In an illustrative embodiment, any of the operations described herein can be implemented at least in part as computer-readable instructions stored on a computer-readable medium or memory. Upon execution of the computer-readable instructions by a processor, the computer-readable instructions can cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:

receiving, by a processor of a keyboard, a memory keystroke signal, wherein the memory keystroke signal is received in response to a user depressing a first physical key on the keyboard;

initiating, by the processor, a recording mode in response to receiving the memory keystroke signal, during which received any keystroke signals received are recorded in a buffer;

receiving, by the processor during the recording mode, one or more keystroke signals and recording the one or more keystroke signals in the buffer;

receiving, by the processor, a recall memory keystroke signal, wherein the recall keystroke signal is received in response to the user depressing a second physical key on the keyboard;

ending, by the processor, the recording mode in response to receiving the recall memory keystroke signal and initiating a recall memory mode;

storing, by the processor, in a memory of the keyboard, an association between the recall memory keystroke signal and the one or more keystroke signals recorded in the buffer during the recording mode;

receiving, by the processor, the recall memory keystroke signal from the keyboard during the recall memory mode in response to the user again depressing the second physical key on the keyboard; and sending, by the processor during the recall memory mode and in response to receiving the recall memory keystroke signal, each of the one or more keystroke signals directly to a second computing device in the order in which the one or more keystroke signals were recorded during the recording mode.

2. The method of claim 1, further comprising receiving, by the processor, along with the recall keystroke signal during the recall memory mode, an alternate function keystroke signal.

3. The method of claim 2, wherein the alternate function keystroke signal is generated when at least one of an alt key, a control key, a shift key, an option key, a function key, or a command key on the keyboard is pressed.

4. The method of claim 2, further comprising determining, by the processor, an alternate one or more keystroke signals from the memory associated with the alternate function keystroke signal and the recall memory keystroke signal.

5. The method of claim 4, further comprising sending, by the processor during the recall memory mode and in response to receiving the recall memory keystroke signal and the alternate function keystroke signal, the alternate one or more keystroke signals directly to a second computing device.

6. A system comprising:

a memory of a keyboard; and a processor of the keyboard coupled to the memory, wherein the processor is configured to:

receive a memory keystroke signal, wherein the memory keystroke signal is received in response to a user depressing a first physical key on the keyboard;

initiate a recording mode in response to receiving the memory keystroke signal, during which received any keystroke signals received are recorded in a buffer;

receive, during the recording mode, one or more keystroke signals and record the one or more keystroke signals in the buffer;

receive a recall memory keystroke signal, wherein the recall keystroke signal is received in response to the user depressing a second physical key on the keyboard;

end the recording mode in response to receiving the recall memory keystroke signal and initiate a recall memory mode;

store, in a memory of the keyboard, an association between the recall memory keystroke signal and the one or more keystroke signals recorded in the buffer during the recording mode;

receive the recall memory keystroke signal from the keyboard during the recall memory mode in response to the user again depressing the second physical key on the keyboard; and send, during the recall memory mode and in response to receiving the recall memory keystroke signals, each of the one or more keystroke signals directly to a second computing device in the order in which the one or more keystroke signals were recorded during the recording mode.

7. The system of claim 6, wherein the first physical key and the second physical key are a same key on the keyboard.

8. The system of claim 6, wherein the first physical key and the second physical key are different physical keys on the keyboard.

9. A non-transitory computer readable medium having instructions stored thereon that, upon execution by a processor of a keyboard, cause the processor to perform operations comprising:

receiving a memory keystroke signal, wherein the memory keystroke signal is received in response to a user depressing a first physical key on the keyboard;

initiating a recording mode in response to receiving the memory keystroke signal, during which received any keystroke signals received are recorded in a buffer;

receiving, during the recording mode, one or more keystroke signals and recording the one or more keystroke signals in the buffer;

receiving a recall memory keystroke signal, wherein the recall keystroke signal is received in response to the user depressing a second physical key on the keyboard;

ending the recording mode in response to receiving the recall memory keystroke signal and initiating a recall memory mode;

storing, in a memory of the keyboard, an association between the recall memory keystroke signal and the one or more keystroke signals recorded in the buffer during the recording mode;

receiving the recall memory keystroke signal from the keyboard during the recall memory mode in response to the user again depressing the second physical key on the keyboard; and sending, during the recall memory mode and in response to receiving the recall memory keystroke signals, each of the one or more keystroke signals directly to a second computing device in the order in which the one or more keystroke signals were recorded during the recording mode.

10. The system of claim 6, wherein the keyboard further comprises a plurality of physical recall memory keys.

11. The system of claim 10, wherein the processor is further configured to, during a second recording mode, receive a second recall memory keystroke signal from one of the plurality of physical recall memory keys.

12. The system of claim 11, wherein the processor is further configured to, in response to receiving the second recall memory keystroke signal from one of the plurality of physical recall memory keys, end the recording mode and initiate a recall memory mode.

13. The system of claim 12, wherein the processor is further configured to store, in the memory of the keyboard, a second association between the second recall memory keystroke signal and a second one or more keystroke signals recorded in the buffer during the second recording mode.

14. The system of claim 13, wherein the processor is further configured to, during the recall memory mode, receive the second recall memory keystroke signal and, in response, send each of the second one or more keystroke signals directly to a second computing device in the order in which the second one or more keystroke signals were recorded during the second recording mode.

15. The system of claim 13, wherein the second one or more keystroke signals stored as the second association are associated with only one of the plurality of physical recall memory keys that was pressed by the user during the second recording mode.

16. The system of claim 6, wherein each of the one or more keystroke signals are associated with a plurality of physical keys of the keyboard.

* * * * *